United States Patent
Yuasa

(10) Patent No.: US 10,809,788 B2
(45) Date of Patent: Oct. 20, 2020

(54) ELECTRONIC SYSTEM, INFORMATION PROCESSING DEVICE, AND CONTROL METHOD

(71) Applicant: FUJITSU LIMITED, Kawasaki-shi, Kanagawa (JP)

(72) Inventor: Kentarou Yuasa, Chofu (JP)

(73) Assignee: FUJITSU LIMITED, Kawasaki (JP)

(*) Notice: Subject to any disclaimer, the term of this patent is extended or adjusted under 35 U.S.C. 154(b) by 135 days.

(21) Appl. No.: 16/222,394

(22) Filed: Dec. 17, 2018

(65) Prior Publication Data

US 2019/0235599 A1 Aug. 1, 2019

(30) Foreign Application Priority Data

Jan. 30, 2018 (JP) ................. 2018-013726

(51) Int. Cl.
*G06F 1/30* (2006.01)
*H02J 7/00* (2006.01)
*G06F 12/0804* (2016.01)
*G06F 1/26* (2006.01)
*G06F 3/06* (2006.01)

(52) U.S. Cl.
CPC ............... *G06F 1/30* (2013.01); *G06F 1/263* (2013.01); *G06F 3/06* (2013.01); *G06F 12/0804* (2013.01); *H02J 7/0013* (2013.01); *G06F 2212/1032* (2013.01); *H02J 2310/18* (2020.01)

(58) Field of Classification Search
CPC .. G06F 12/0804; G06F 12/0868; G06F 1/263; G06F 1/30; G06F 2212/1028; G06F 2212/1032; G06F 2212/2212; G06F 2212/214; G06F 2212/224; G06F 3/06; G06F 3/0625; G06F 3/0634; G06F 3/0689; H02J 2310/18; H02J 7/0013; H02J 7/0063; H02J 9/00; H02J 9/061
See application file for complete search history.

(56) References Cited

U.S. PATENT DOCUMENTS

| | | | | |
|---|---|---|---|---|
| 2006/0076396 A1* | 4/2006 | Lima | ................. | G06F 1/263 235/375 |
| 2007/0094446 A1* | 4/2007 | Sone | ................. | G06F 1/263 711/113 |
| 2010/0299548 A1* | 11/2010 | Chadirchi | ............. | G06F 1/263 713/340 |

FOREIGN PATENT DOCUMENTS

| JP | 2006-163455 | 6/2006 |
|---|---|---|
| JP | 2006-313407 | 11/2006 |

* cited by examiner

*Primary Examiner* — Terrell S Johnson
(74) *Attorney, Agent, or Firm* — Fujitsu Patent Center

(57) ABSTRACT

An electronic system includes N electronic components where N is an integer of 2 or more, (N+1) batteries, and N selection circuits associated with the respective N electronic components. Each of the N electronic components is coupled to two batteries among the (N+1) batteries. Combinations of two batteries coupled to the respective N electronic components are different from each other. Each of (N−1) batteries among the (N+1) batteries is coupled to two electronic components among the N electronic components. Combinations of two electronic components coupled to the respective (N−1) batteries are different from each other. Each of the N selection circuits is configured to supply, as driving power, electric power output from at least one of two batteries coupled to a corresponding electronic component among the N electronic components to the corresponding electronic component.

11 Claims, 24 Drawing Sheets

FIG. 5

|  | DISCHARGE DESTINATION CM | RESIDUAL BATTERY LEVEL AFTER BACKUP | REQUIRED CHARGE AMOUNT |
| --- | --- | --- | --- |
| BBU#0 | CM#0 | 30% | 40% (= 70% - 30%) |
| BBU#1 | CM#1 | 50% | 20% (= 70% - 50%) |

FIG. 11

|  | DISCHARGE DESTINATION CM | RESIDUAL BATTERY LEVEL AFTER BACKUP | REQUIRED CHARGE AMOUNT |
|---|---|---|---|
| BBU#0 (FAILED) | - | - | - |
| BBU#1 | CM#0 | 30% | 40% (= 70% - 30%) |
| BBU#2 | CM#1 | 50% | 20% (= 70% - 50%) |

FIG. 14

| FAILED BBU | INPUT TERMINAL TO BE TURNED ON | | | |
|---|---|---|---|---|
| | CM#0 | CM#1 | CM#2 | CM#3 |
| BBU#0 | IN2 | IN2 | IN2 | IN2 |
| BBU#1 | IN1 | IN2 | IN2 | IN2 |
| BBU#2 | IN1 | IN1 | IN2 | IN2 |
| BBU#3 | IN1 | IN1 | IN1 | IN2 |
| BBU#4 | IN1 | IN1 | IN1 | IN1 |

|  | DISCHARGE DESTINATION CM | RESIDUAL BATTERY LEVEL AFTER BACKUP | REQUIRED CHARGE AMOUNT |
|---|---|---|---|
| BBU#0 | CM#0 | 65%<br>(= 100% - 70%/2) | 5% (= 70% - 65%) |
| BBU#1 | CM#0 | 65%<br>(= 100% - 70%/2) | 5% (= 70% - 65%) |
| BBU#2 | CM#1 | 50% | 20% (= 70% - 50%) |

| CM HAVING MAXIMUM AMOUNT OF DIRTY DATA | INPUT TERMINAL TO BE TURNED ON | | | |
|---|---|---|---|---|
| | CM#0 | CM#1 | CM#2 | CM#3 |
| CM#0 | IN1, IN2 | IN2 | IN2 | IN2 |
| CM#1 | IN1 | IN1, IN2 | IN2 | IN2 |
| CM#2 | IN1 | IN1 | IN1, IN2 | IN2 |
| CM#3 | IN1 | IN1 | IN1 | IN1, IN2 |

ELECTRONIC SYSTEM, INFORMATION PROCESSING DEVICE, AND CONTROL METHOD

CROSS-REFERENCE TO RELATED APPLICATION

This application is based upon and claims the benefit of priority of the prior Japanese Patent Application No. 2018-013726, filed on Jan. 30, 2018, the entire contents of which are incorporated herein by reference.

FIELD

The embodiments discussed herein are related to an electronic system, an information processing device, and a control method.

BACKGROUND

An information processing device is generally operated by electric power supplied from an external power source, and a battery as a countermeasure against power outage may be coupled to such an information processing device. Through this configuration, when a power outage occurs, it is guaranteed that the information processing device is capable of executing a predetermined processing by using electric power from the battery. For example, an information processing device having a volatile storage device copies data stored in the volatile storage device to a non-volatile storage device by using electric power from a battery when a power outage occurs. Accordingly, a loss of the data stored in the volatile storage device may be prevented.

The following techniques that use batteries have been suggested. For example, there is suggested a disk array device in which two array control units each of which includes a cache memory, and two power supply units each of which includes a battery are cross-connected. There is also suggested, for example, a RAID (redundant arrays of inexpensive disks) device in which a residual battery level is monitored, and then the allowable amount of dirty data within a cache memory is controlled based on the residual battery level.

Related techniques are disclosed in, for example, Japanese Laid-open Patent Publication No. 2006-163455 and Japanese Laid-open Patent Publication No. 2006-313407.

SUMMARY

According to an aspect of the present invention, provide is an electronic system including N electronic components where N is an integer of 2 or more, (N+1) batteries, and N selection circuits associated with the respective N electronic components. Each of the N electronic components is coupled to two batteries among the (N+1) batteries. Combinations of two batteries coupled to the respective N electronic components are different from each other. Each of (N−1) batteries among the (N+1) batteries is coupled to two electronic components among the N electronic components. Combinations of two electronic components coupled to the respective (N−1) batteries are different from each other. Each of the N selection circuits is configured to supply, as driving power, electric power output from at least one of two batteries coupled to a corresponding electronic component among the N electronic components to the corresponding electronic component.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of a charge amount in a BBU after power is restored;

FIG. 11 is a view illustrating an example of a charge amount in a BBU after power is restored;

FIG. 14 is a view illustrating an example of a control pattern in a case where a BBU is failed;

FIG. 16 is a view illustrating an example of a charge amount in a BBU after power is restored;

FIG. 18 is a view illustrating an example of a control pattern in a case where no BBU is failed;

DESCRIPTION OF EMBODIMENTS

There is a case where a configuration is employed in which when a plurality of information processing devices are present, a battery as a countermeasure against power outage is individually coupled to each information processing device. In such a case, as a method of making a battery redundant in preparation for a battery failure, a method of coupling a plurality of batteries to each information processing device may be taken into consideration. However, this method has a problem in that as the number of information processing devices increases, the number of batteries to be coupled also increases, resulting in an increase in a cost or an installation space of the batteries.

This problem is not limited to information processing devices but occurs in any electronic component driven by electric power supplied from an external power source.

Hereinafter, embodiments of the present disclosure will be described with reference to drawings.

First Embodiment

Figure 1:
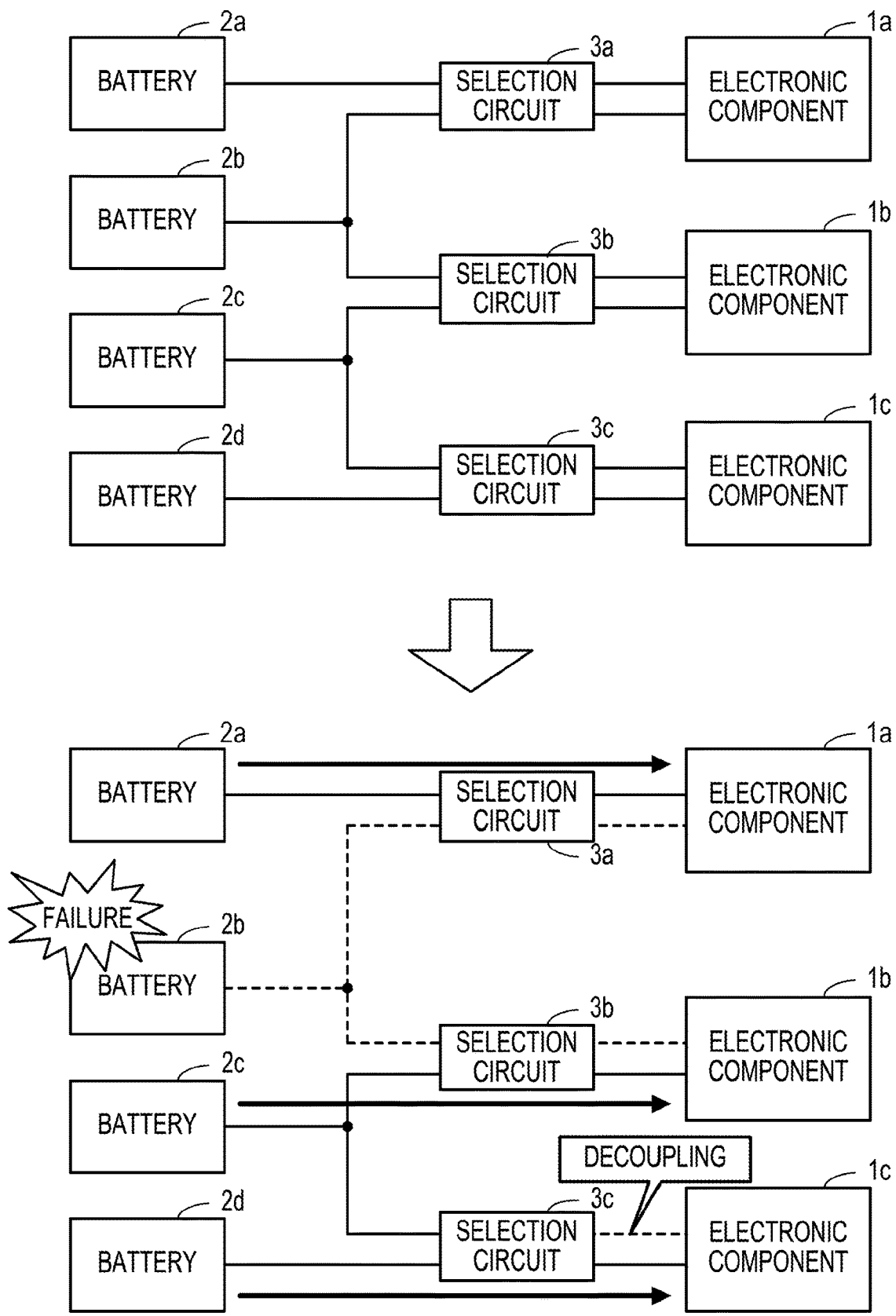
FIG. 1 is a view illustrating a configuration example and an operation example of an electronic system according to a first embodiment.

FIG. 1 is a view illustrating a configuration example and an operation example of an electronic system according to a first embodiment. The electronic system illustrated in FIG. 1 includes two or more electronic components, and one more batteries than the number of electronic components. In FIG. 1, as an example, the electronic system includes three electronic components $1a$ to $1c$, and four batteries $2a$ to $2d$. Selection circuits $3a$, $3b$, and $3c$ are formed in association with the electronic components $1a$, $1b$, and $1c$, respectively.

The electronic components $1a$ to $1c$ are operated by electric power supplied from the outside. In the present embodiment, the electronic components $1a$ to $1c$ and the batteries $2a$ to $2d$ are coupled to each other in accordance with the following coupling conditions so that each of the electronic components $1a$ to $1c$ are operated by electric power supplied from at least one of the batteries $2a$ to $2d$.

Each of the electronic components $1a$ to $1c$ is coupled to two batteries among the batteries $2a$ to $2d$. Meanwhile, the combinations of two batteries coupled to each of the electronic components $1a$ to $1c$ are all different. In the example of FIG. 1, the electronic component $1a$ is coupled to the batteries $2a$ and $2b$, the electronic component $1b$ is coupled to the batteries $2b$ and $2c$, and the electronic component $1c$ is coupled to the batteries $2c$ and $2d$.

Each of two batteries among the batteries $2a$ to $2d$ (the number of batteries in which two are subtracted from the total number) is coupled to two components among the electronic components $1a$ to $1c$. Meanwhile, the combinations of two electronic components coupled to each of the batteries $2a$ to $2d$ are all different. In the example of FIG. 1, the battery $2b$ is coupled to two electronic components $1a$ and $1b$, and the battery $2c$ is coupled to two electronic components $1b$ and $1c$. Meanwhile, the battery $2a$ is coupled to only one electronic component $1a$, and the battery $2d$ is coupled to only one electronic component $1c$.

The selection circuit $3a$ supplies electric power output from at least one of the two batteries $2a$ and $2b$ coupled to the electronic component $1a$ to the electronic component $1a$ as driving power. The selection circuit $3b$ supplies electric power output from at least one of the two batteries $2b$ and $2c$ coupled to the electronic component $1b$ to the electronic component $1b$ as driving power. The selection circuit $3c$ supplies electric power output from at least one of the two batteries $2c$ and $2d$ coupled to the electronic component $1c$ to the electronic component $1c$ as driving power.

The selection circuits $3a$, $3b$, and $3c$ may be formed inside the electronic components $1a$, $1b$, and $1c$, respectively. With the electronic system as configured above, even when any one battery among the batteries $2a$ to $2d$ is failed, it is possible to reliably supply electric power from mutually different normal batteries to each of the electronic components $1a$ to $1c$ by switching control of the selection circuits $3a$ to $3c$. For example, as illustrated at the lower side in FIG. 1, it is assumed that the battery $2b$ is failed. In this case, the selection circuit $3a$ supplies electric power from the battery $2a$ to the electronic component $1a$. The selection circuit $3b$ supplies electric power from the battery $2c$ to the electronic component $1b$. The selection circuit $3c$ supplies electric power from the battery $2d$ to the electronic component $1c$ while cutting off supply of electric power from the battery $2c$.

Although not illustrated, when the battery $2a$ is failed, the following control is performed. The selection circuit $3a$ supplies electric power from the battery $2b$ to the electronic component $1a$. The selection circuit $3b$ supplies electric power from the battery $2c$ to the electronic component $1b$ while cutting off supply of electric power from the battery $2b$. The selection circuit $3c$ supplies electric power from the battery $2d$ to the electronic component $1c$ while cutting off supply of electric power from the battery $2c$.

Although not illustrated, when the battery $2c$ is failed, the following control is performed. The selection circuit $3a$ supplies electric power from the battery $2a$ to the electronic component $1a$ while cutting off supply of electric power from the battery $2b$. The selection circuit $3b$ supplies electric power from the battery $2b$ to the electronic component $1b$. The selection circuit $3c$ supplies electric power from the battery $2d$ to the electronic component $1c$.

Although not illustrated, when the battery $2d$ is failed, the following control is performed. The selection circuit $3a$ supplies electric power from the battery $2a$ to the electronic component $1a$ while cutting off supply of electric power from the battery $2b$. The selection circuit $3b$ supplies electric power from the battery $2b$ to the electronic component $1b$ while cutting off supply of electric power from the battery $2c$. The selection circuit $3c$ supplies electric power from the battery $2c$ to the electronic component $1c$.

In this manner, with the electronic system according to the present embodiment, even when any one battery among the batteries $2a$ to $2d$ is failed, it is possible to reliably supply electric power from mutually different normal batteries to each of the electronic components $1a$ to $1c$. That is, it is possible to ensure the redundancy of batteries by using one more batteries than the number of electronic components.

For example, when electronic components are added, as many batteries (and selection circuits) as the added electronic components are added, and in accordance with the above-described coupling conditions, the electronic components may be coupled to the batteries. Accordingly, as in that before addition, it is possible to supply electric power from mutually different normal batteries to each of the electronic components.

In this manner, with the electronic system according to the present embodiment, it is possible to ensure the redundancy of batteries by using a small number of batteries.

Second Embodiment

Hereinafter, descriptions will be made on a storage system using a storage control device, as an example of the electronic components $1a$ to $1c$ illustrated in FIG. 1.

<System Configuration>

Figure 2:
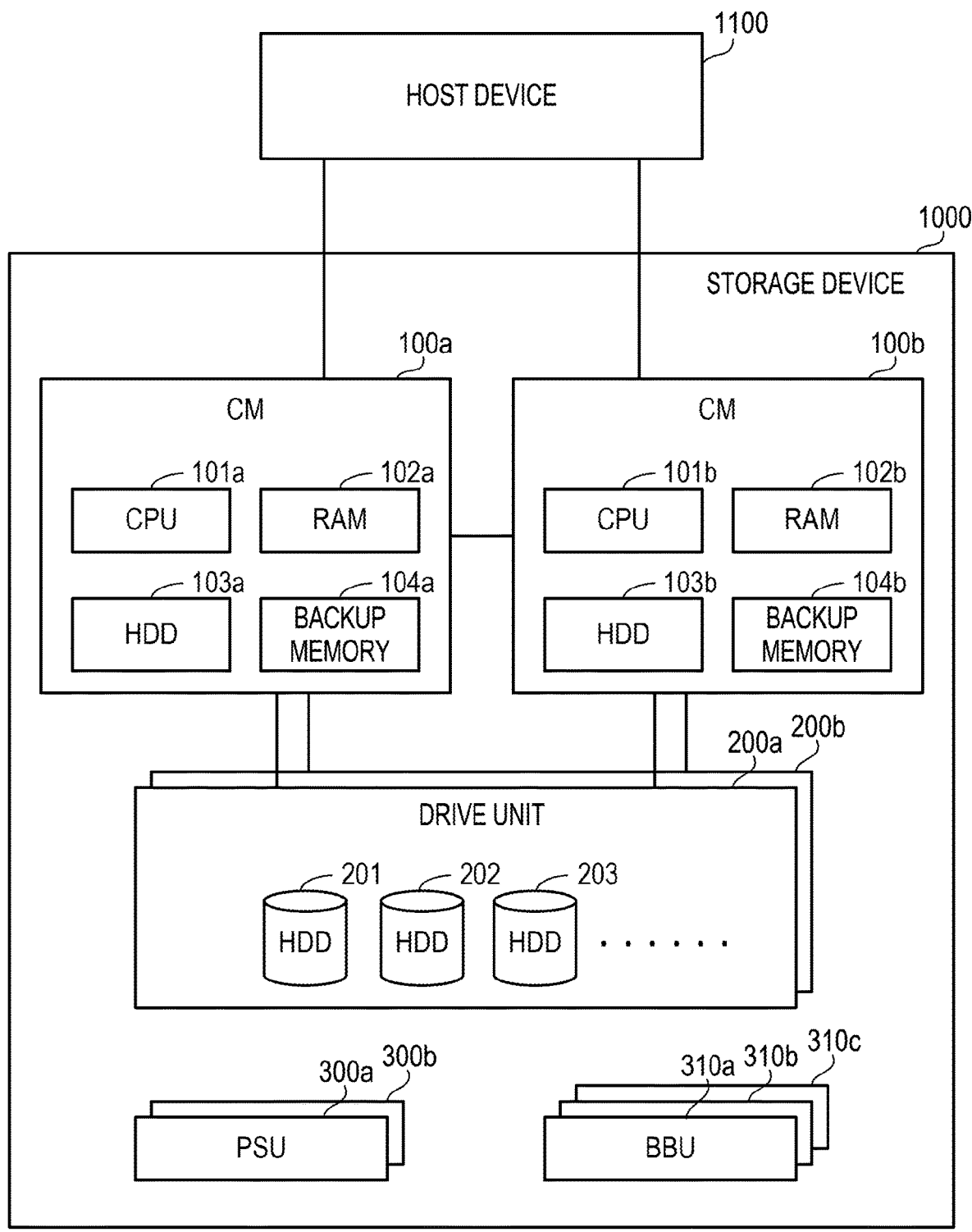
FIG. 2 is a view illustrating a configuration example of a storage system according to a second embodiment.

FIG. 2 is a view illustrating a configuration example of a storage system according to a second embodiment. The storage system illustrated in FIG. 2 includes a storage device 1000 and a host device 1100. In the storage device 1000, a plurality of controller modules (CMs), one or more drive units, a plurality of power supply units (PSUs), and a plurality of battery backup units (BBUs) are mounted. In FIG. 2, as an example, in the storage device 1000, two CMs 100a and 100b, two drive units 200a and 200b, two PSUs 300a and 300b, and three BBUs 310a to 310c are mounted. As described below, the number of mounted BBUs is larger than the number of CMs by one.

The CMs 100a and 100b are examples of the electronic components 1a to 1c illustrated in FIG. 1. The BBUs 310a to 310c are examples of the batteries 2a to 2d illustrated in FIG. 1. The CMs 100a and 100b are coupled to the host device 1100. The CMs 100a and 100b are storage control devices which access storages mounted in the drive units 200a and 200b, in response to a request from the host device 1100. For example, at least one logical volume using a storage area of the storage mounted in each of the drive units 200a and 200b is set with respect to each of the CMs 100a and 100b. The CM 100a accepts an access request for a logical volume set in its own device, from the host device 1100, and executes an access control processing in accordance with the request. Likewise, the CM 100b accepts an access request for a logical volume set in its own device, from the host device 1100, and executes an access control processing in accordance with the request.

The CM 100a includes a central processing unit (CPU) 101a, a random access memory (RAM) 102a, a hard disk drive (HDD) 103a, and a backup memory 104a.

The CPU 101a comprehensively controls the entire CM 100a. The CPU 101a includes, for example, one or more processors. The RAM 102a is a main storage device of the CM 100a. The RAM 102a temporarily stores at least a part of a program of an operating system (OS) or an application program to be executed by the CPU 101a. The RAM 102a stores various data used in a processing by the CPU 101a.

The HDD 103a is an auxiliary storage device of the CM 100a. In the HDD 103a, a program of an OS, an application program, and various data are stored. The CM 100a may also include a solid state drive (SSD), instead of the HDD 103a, as an auxiliary storage device.

The backup memory 104a is a non-volatile storage device that backs up a part of data stored in the RAM 102a when a power outage occurs. In the present embodiment, a cache area is secured in the RAM 102a. Then, when a power outage occurs, among cache data pieces within the cache area, dirty data not written in the storage areas of the drive units 200a and 200b is backed up in the backup memory 104a. The backup memory 104a is realized as, for example, a non-volatile RAM (NVRAM).

As in the CM 100a, the CM 100b also includes a CPU 101b, a RAM 102b, an HDD 103b, and a backup memory 104b. Functions of the CPU 101b, the RAM 102b, the HDD 103b, and the backup memory 104b are the same as those in the CPU 101a, the RAM 102a, the HDD 103a, and the backup memory 104a of the CM 100a, respectively, and thus, explanations thereof will be omitted herein.

In each of the drive units 200a and 200b, a plurality of HDDs is mounted as storages to be accessed by the host device 1100. For example, HDDs 201, 202, 203, . . . are mounted in the drive unit 200a. The storage mounted in each of the drive units 200a and 200b is not limited to the HDD, and may also be another type of non-volatile storage device such as an SSD.

The PSUs 300a and 300b accept electric power supplied from an external power source (not illustrated), and supply electric power to respective units within the storage device 1000 based on the electric power. In the storage device 1000, by making a PSU redundant, the probability that a power outage occurs due to a failure of a PSU is reduced.

The BBUs 310a to 310c are backup power sources that supply electric power to the CM 100a and the CM 100b, at the time of a power outage, at which supply of electric power from an external power source is stopped, and include batteries, respectively. As described below, at the time of a power outage, each of the BBUs 310a to 310c is controlled so as to supply electric power to at least one of the CMs 100a and 100b.

The host device 1100 is a computer that executes, for example, various business processes. The host device 1100 and the CMs 100a and 100b are coupled to each other via, for example, a storage area network (SAN) using a fibre channel (FC), an internet small computer system interface (iSCSI), etc.

<Write Control Using Cache Area>

In the storage device 1000, a cache area is used in a write control of data on a logical volume. Specifically, the CM 100a secures a cache area in the RAM 102a, and temporarily stores a part of write data, in the cache area while controlling an access to a logical volume. Likewise, the CM 100b also secures a cache area in the RAM 102b, and temporarily stores a part of data to be read and written, in the cache area while controlling an access to a logical volume.

In a state where electric power is normally supplied from an external power source, each of the CMs 100a and 100b performs a write control on the logical volume in a write back mode. That is, each of the CMs 100a and 100b writes write data requested for writing by the host device 1100, in the cache area, and gives a response of writing completion to the host device 1100. Then, at a predetermined timing after writing in the cache areas, the CMs 100a and 100b copy the write data from the cache areas to the storage areas of the drive units 200a and 200b (write back).

Meanwhile, the BBUs are provided to supply electric power to the CMs 100a and 100b when a power outage occurs. When a power outage occurs, the CMs 100a and 100b back up dirty data included in the cache areas, in the backup memories 104a, and 104b, respectively, by using electric power from the BBUs. Accordingly, dirty data is protected, and a loss thereof is prevented.

Thereafter, when supply of electric power from an external power source is restored (when power is restored), the CMs 100a and 100b execute a restoration processing of the dirty data stored in the backup memories. In the restoration processing, for example, the dirty data stored in the backup memories is written in the storage areas of the drive units 200a and 200b. The BBUs are charged with electric power supplied from the PSUs.

When the restoration processing of the dirty data is completed, each of the CMs 100a and 100b may resume an access control on the logical volume in accordance with a request from the host device 1100. Meanwhile, until the charge amount of the BBU reaches a certain amount, each of the CMs 100a and 100b performs a write control on the logical volume in a write through mode. This is because, until the charge amount of the BBU reaches a certain amount, when a power outage occurs again, it is not guaranteed that all dirty data pieces within the cache area will be backed up. In the write through mode, each of the CMs 100a and 100b writes write data requested for writing by the host device 1100 in the cache area, and at the same time, writes the write data in the storage area of each of the drive units 200a and 200b as well, and gives a response of writing completion to the host device 1100 after the completion of the writing.

Thereafter, when the charge amount of the BBU reaches a certain amount, the CMs 100a and 100b switch a write control mode from a write through mode to a write back mode. As compared to the write through mode, in the write back mode, it is possible to shorten a response time to a write request from the host device 1100. That is, immediately after power is restored, a period is generated in which a response performance to a write request is low.

A residual battery level threshold, by which a timing of switching to a write back mode is determined, is determined depending on a size of a cache area. That is, a minimum battery capacity required for transmitting all data pieces of the cache area to a backup memory is determined as a threshold. Hereinafter, a residual battery level threshold for this determination will be described as a "residual level threshold TH." Then, from the residual level threshold TH and a residual battery level of the BBU immediately before power is restored, a length of a period until switching to a write back mode is made from power restoration, that is, a period during which a response performance to a write request is low, is determined.

<Comparative Example Related to Installation of BBU, and Problems Thereof>

Hereinafter, problems in making a BBU redundant will be described. When a BBU is failed at the time of occurrence of a power outage, it becomes impossible to back up dirty data. Thus, in preparation for the failure of a BBU, the BBU is made redundant. Here, with reference to FIGS. 3 and 4, Comparative Examples related to installation of a BBU will be described.

Figure 3:
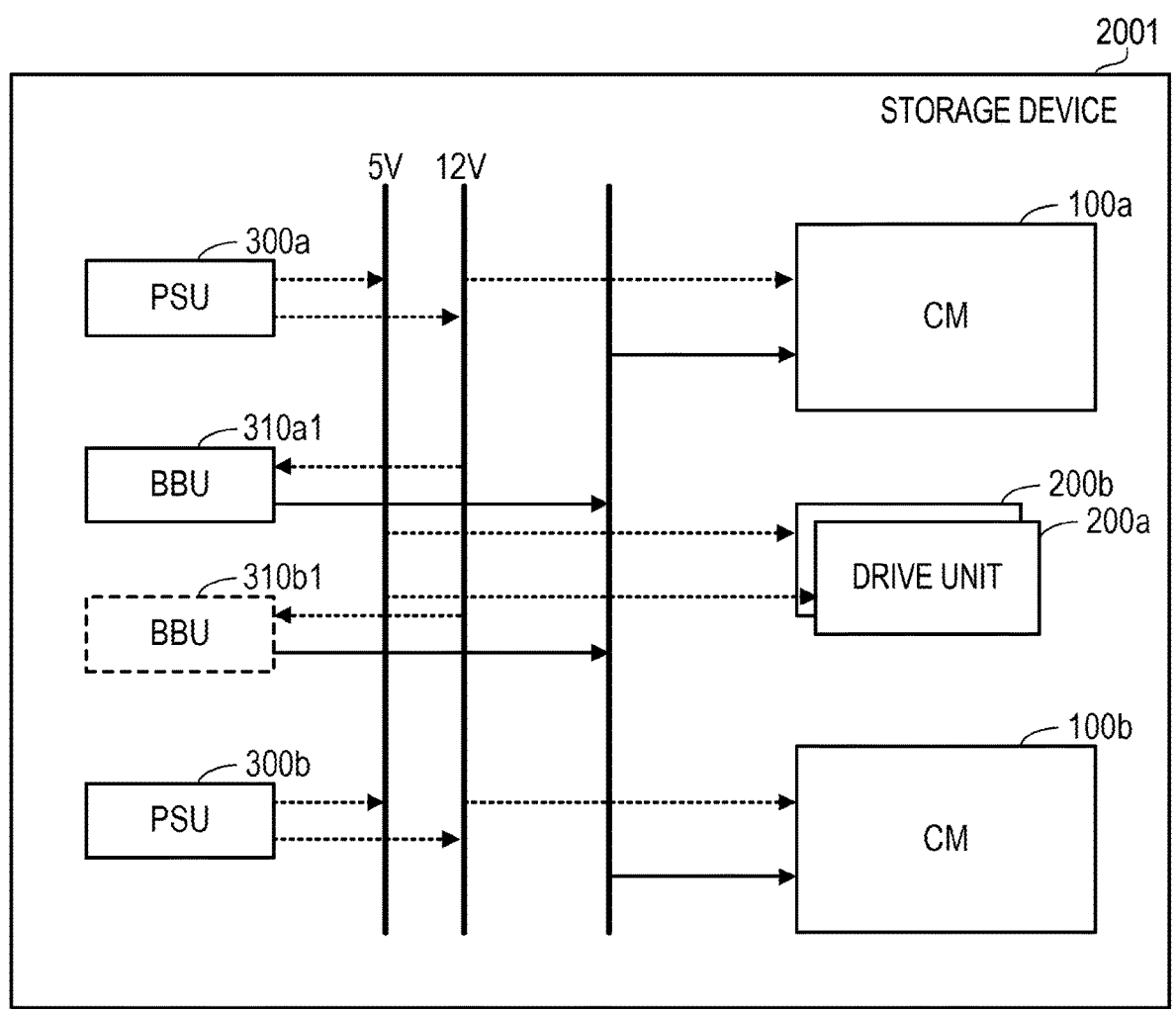
FIG. 3 is a view illustrating a first Comparative Example related to installation of a BBU.
Figure 4:
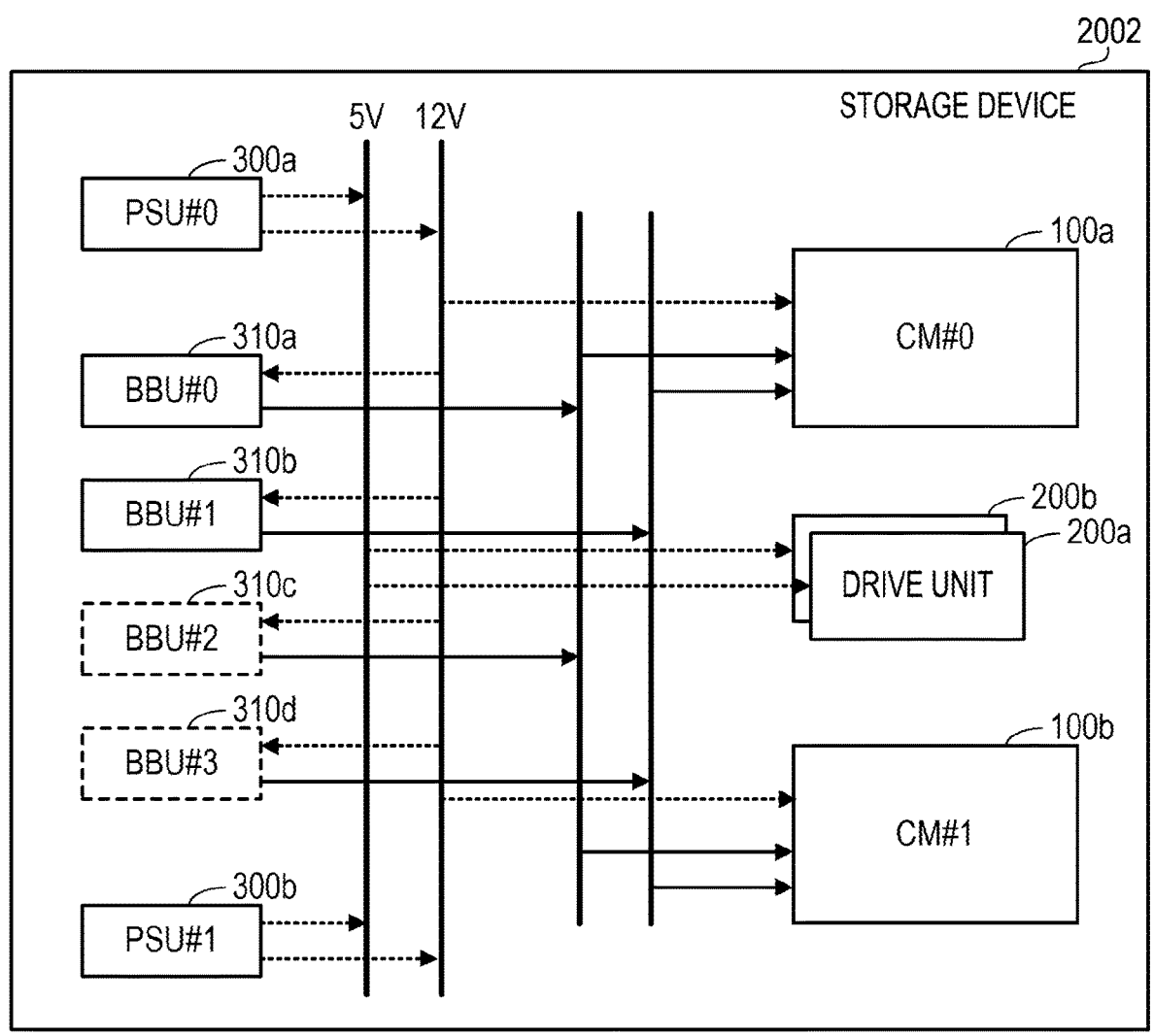
FIG. 4 is a view illustrating a second Comparative Example related to installation of a BBU.

FIG. 3 is a view illustrating a first Comparative Example related to installation of a BBU. In the illustration in FIG. 3, the same constituent elements as those in FIG. 2 are given the same reference numerals. Like the storage device 1000 illustrated in FIG. 2, a storage device 2001 illustrated in FIG. 3 includes two CMs 100a and 100b. Like in the storage device 1000 illustrated in FIG. 2, two drive units 200a and 200b and two PSUs 300a and 300b are also mounted.

The PSUs 300a and 300b output electric power (5V-electric power) having a voltage of 5V and electric power (12V-electric power) having a voltage of 12V. The 5V-electric power is supplied to the drive units 200a and 200b, and the 12V-electric power is supplied to the CMs 100a and 100b and the BBU. In this configuration, when one of the PSUs 300a and 300b is failed, the other is allowed to supply the 5V-electric power commonly to the drive units 200a and 200b, and to supply the 12V-electric power commonly to the CMs 100a and 100b. That is, the PSU is commonly provided for the plurality of CMs, and is made redundant on a storage device basis.

In the example of FIG. 3, one BBU 310a1 is mounted in the storage device 2001. Then, when a power outage occurs, the BBU 310a1 supplies electric power commonly to the CMs 100a and 100b. In this manner, the BBU 310a1 is provided for the plurality of CMs 100a and 100b in common, and thus has a battery capacity by which all dirty data pieces included in cache areas of both the CMs 100a and 100b is transmittable to backup memories.

In such a configuration, as a method of making a BBU redundant in preparation for failure, as indicated by a broken line in FIG. 3, a method of adding another BBU 310b1 that supplies electric power commonly to the CMs 100a and 100b may be taken into consideration. This method has the following advantages. Each of the BBUs 310a1 and 310b1 has a battery capacity by which all dirty data pieces included in cache areas of both the CMs 100a and 100b are transmittable. Thus, even when either of the BBUs is failed, by electric power from the other BBU, it is possible to transmit all dirty data pieces included in the cache areas of both the CMs 100a and 100b to backup memories.

Meanwhile, since each of the BBUs 310a1 and 310b1 has a large battery capacity, the cost may increase due to the redundancy of the BBU. Also, since a parallel discharge circuit that supplies electric power from one BBU to each of a plurality of CMs becomes necessary for each of the BBUs 310a1 and 310b1, an installation space of the BBU may increase in size.

Whereas, next, as illustrated in FIG. 4, a method of making a BBU redundant on a CM basis may also be taken into consideration. FIG. 4 is a view illustrating a second Comparative Example related to installation of a BBU. In the illustration in FIG. 4, the same constituent elements as those in FIGS. 2 and 3 are given the same reference numerals. Thereafter, the CM 100a and the CM 100b may be denoted by a CM#0 and a CM#1, respectively, the PSU 300a and the PSU 300b may be denoted by a PSU#0 and a PSU#1, respectively, and the BBU 310a, the BBU 310b, the BBU 310c, and a BBU 310d may be denoted by a BBU#0, a BBU#1, a BBU#2, and a BBU#3, respectively.

In a storage device 2002 illustrated in FIG. 4, the BBU 310a (BBU#0) that supplies electric power to the CM 100a (CM#0), and the BBU 310b (BBU#1) that supplies electric power to the CM 100b (CM#1) are individually mounted. With this configuration, each of the BBUs 310a and 310b may have only a battery capacity by which dirty data included in a cache area of one CM is transmittable. Thus, as compared to the configuration of FIG. 3, the battery capacity of each BBU may be reduced. Since the above parallel discharge circuit becomes unnecessary, an internal configuration of each BBU may be simplified, and thus the installation space of the BBU may also be reduced.

Further, as compared to the configuration of FIG. 3 (but, the configuration in the case where a BBU is not redundant), there is a possibility that the time until a write control in a write back mode is resumable after power is restored may be shortened. Hereinafter, this effect will be described with reference to FIG. 5.

FIG. 5 is a view illustrating an example of a charge amount in a BBU after power is restored. Here, it is assumed that battery capacities of the BBU#0 and the BBU#1 (the BBUs 310a and 310b) are the same, and the above-described residual level threshold TH is set to 70% of a battery capacity of each of the BBU#0 and the BBU#1. That is, it is assumed that all data pieces within a cache area included in each of the CM#0 and the CM#1 (the CMs 100a and 100b) are transmittable to a backup memory by electric power corresponding to 70% of the battery capacity. It is assumed that before a power outage occurs (i.e., before a battery is discharged), the residual battery level of each of the BBU#0 and the BBU#1 is 100%.

Here, the amount of dirty data included in the cache area of the CM#0, and the amount of dirty data included in the cache area of the CM#1 vary depending on the state of an access control in each of the CM#0 and the CM#1, and these amounts may largely vary. Thus, in many cases, the time until a backup processing of dirty data is completed after a power outage occurs is different between the CM#0 and the CM#1. In such a case, after the backup processing is completed, the value of the residual battery level is also different between the BBU#0 and the BBU#1.

In FIG. 5, as an example, it is assumed that the amount of dirty data in the CM#0 is larger than the amount of dirty data in the CM#1, and residual battery levels of the BBU#0 and the BBU#1 become 30% and 50%, respectively, after the backup processing is completed. That is, the BBU#0 discharges 70% of electric power during the backup processing in the CM#0, and the BBU#1 discharges 50% of electric power during the backup processing in the CM#1.

In this case, after power is restored, an amount required for charging the BBU#0 (required charge amount) becomes 40% (=70%−30%). Meanwhile, after power is restored, an amount required for charging the BBU#1 (required charge amount) becomes 20% (=70%−50%). Thus, as compared to the BBU#0, in the BBU#1, the residual battery level reaches the residual level threshold TH in a shorter time. When a residual battery level of a BBU reaches a residual level threshold TH, a write control mode of a CM corresponding to the BBU may be switched from a write through mode to a write back mode. Therefore, in the example of FIG. 5, as compared to the CM#0, in the CM#1, a period until switching to a write back mode is made from power restoration becomes shorter.

Meanwhile, in the configuration of FIG. 3 (the configuration of the case where a BBU is not redundant), the residual level threshold TH of the BBU 310a1 becomes 140% (=70%×2) when expressed in accordance with the scale of a battery capacity in FIG. 5. Then, in the configuration of FIG. 3, even when the amount of dirty data included in each cache area is different between the CMs 100a and 100b, until the residual battery level of the BBU 310a1 reaches an amount corresponding to 140% after power is restored, it is impossible to switch a write control mode to a write back mode in both the CMs 100a and 100b.

In this manner, with the configuration of FIG. 4, as compared to the configuration of FIG. 3, it is possible to shorten the time until a write control in a write back mode is resumable by a CM after power is restored, depending on the amount of dirty data included in a cache area of the CM.

Hereinafter, referring back to FIG. 4, the descriptions will be continued. In the configuration of FIG. 4, as a method of making a BBU redundant, as indicated by a broken line in FIG. 4, a method of adding another BBU 310c (BBU#2) that supplies electric power to the CM 100a, and another BBU 310d (BBU#3) that supplies electric power to the CM 100b may be taken into consideration. When this method is employed, even when any one BBU among the BBUs 310a to 310d is failed, it is possible to transmit all dirty data pieces included in cache areas of both the CMs 100a and 100b to back up memories, by using electric power from another BBU.

However, as compared to the redundancy method illustrated in FIG. 3, although the cost and installation space for each BBU may be suppressed, the number of BBUs increases. Thus, there is a possibility that the cost and installation space for all BBUs increase. Every time one CM is added, two BBUs need to be added. Therefore, as more CMs are added, the number of BBUs increases, resulting in an increase in a cost and an installation space.

Whereas, as described below, the storage device 1000 according to the second embodiment has a configuration in which the time for switching to the write back mode is shortened after power is restored as in the configuration of FIG. 4 while the number of BBUs is suppressed to one more than the number of CMs.

<Details of Storage Device According to Second Embodiment>

Figure 6:
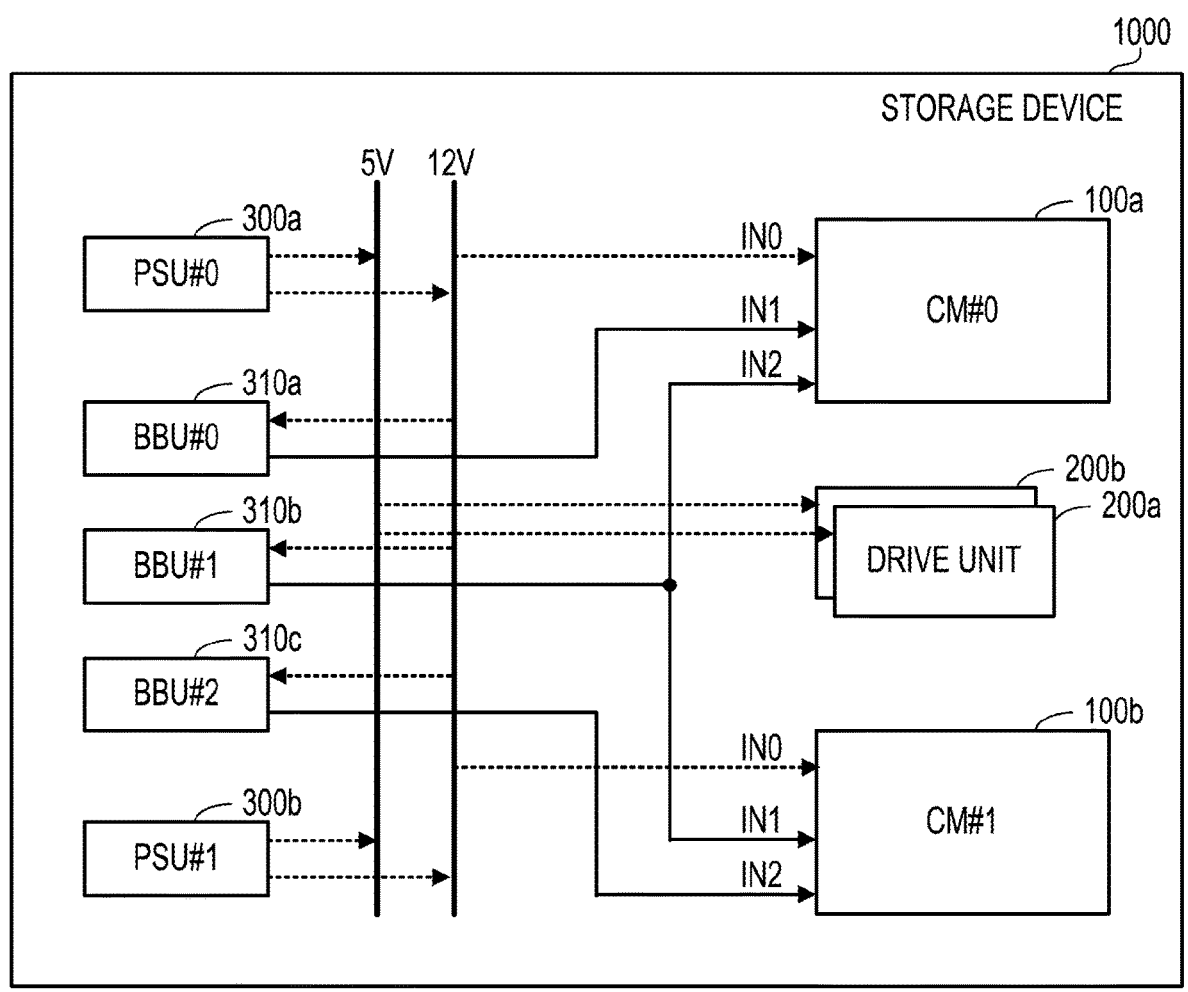
FIG. 6 is a view illustrating a coupling example of BBUs according to the second embodiment.

FIG. 6 is a view illustrating a coupling example of BBUs according to the second embodiment. In the storage device 1000 according to the present embodiment, many BBUs are mounted, the number of which is only one more than the number of CMs. In the example of FIG. 6, in the storage device 1000, two CMs 100a and 100b, and three BBUs 310a to 310c are mounted.

Each of the CMs 100a and 100b has input terminals IN0 to IN2 to which electric power is supplied. The input terminal IN0 is a terminal to which 12V-electric power is supplied from the PSU. To each of the input terminals IN0 of the CMs 100a and 100b, both electric power from the PSU 300a (PSU#0) and electric power from the PSU 300b (PSU#1) may be supplied.

Meanwhile, the input terminals IN1 and IN2 are terminals to which electric power is supplied from the BBUs. In the example of FIG. 6, the wiring between the BBUs and the input terminals IN1 and IN2 is made as follows. The output of the BBU 310a is coupled to the input terminal IN1 of the CM 100a. The output of the BBU 310b is coupled to both the input terminal IN2 of the CM 100a, and the input terminal IN1 of the CM 100b. The output of the BBU 310c is coupled to the input terminal IN2 of the CM 100b.

The 12V-electric power from the PSUs 300a and 300b is also supplied to the BBUs 310a to 310c. Therefore, in a state where electric power is normally supplied from an external power source, the BBUs 310a to 310c are charged with the 12V-electric power.

Figure 7:
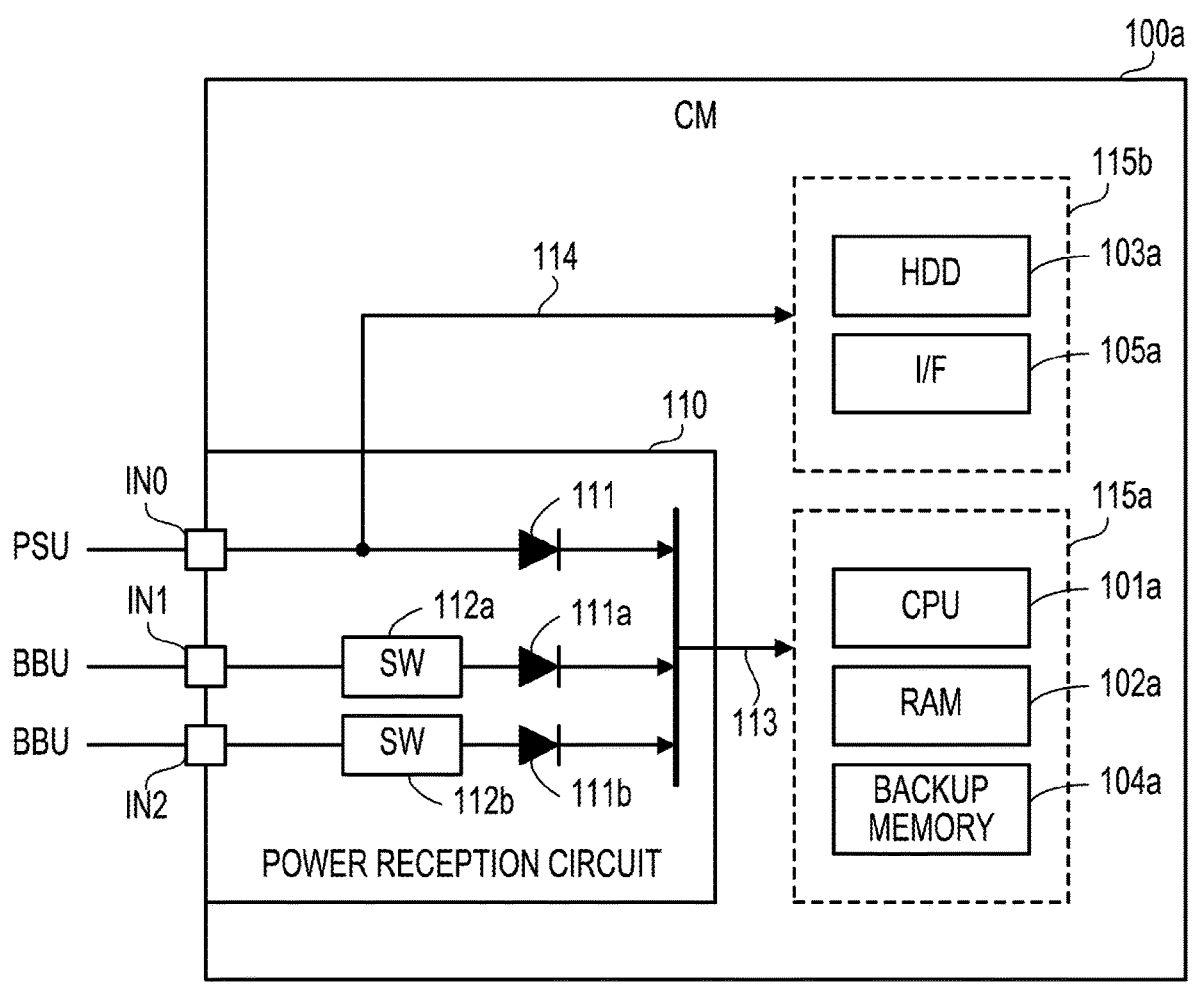
FIG. 7 is a view illustrating a configuration example of a power reception circuit in a CM.

FIG. 7 is a view illustrating a configuration example of a power reception circuit in a CM. FIG. 7 illustrates a configuration of the CM 100a, as an example. The CM 100a includes a power reception circuit 110 as illustrated in FIG. 7. The power reception circuit 110 is an example of each of the selection circuits 3a to 3c illustrated in FIG. 1. The power reception circuit 110 is a circuit that transfers electric power supplied from the input terminals IN0 to IN2 to the inside of the CM 100a, and includes diodes 111, 111a, and 111b and switches 112a and 112b.

The diode 111 prevents the backflow of electric power supplied from the PSU via the input terminal IN0. The diode 111a prevents the backflow of electric power supplied from the BBU 310a via the input terminal IN1. The diode 111b prevents the backflow of electric power supplied from the BBU 310b via the input terminal IN2.

Electric power from the diodes 111, 111a, and 111b is supplied to an internal area 115a of the CM 100a via a power supply line 113. In the internal area 115a, devices that have to operate immediately after a power outage are included. These devices include the CPU 101a that controls a backup processing, the RAM 102a that becomes a backup source, and the backup memory 104a that becomes a backup destination. Although not illustrated, a fan that cools these devices is also included in the internal area 115a. Meanwhile, electric power from the input terminal IN0 is split by a power supply line 114, and is supplied to an internal area 115b of the CM 100a. In the internal area 115b, devices that do not need to operate at the time of power outage are included. These devices include the HDD 103a, an interface (I/F) 105a used for communicating with external devices (e.g., the host device 1100, the drive units 200a and 200b, etc.), etc.

The switch 112a switches between coupling and decoupling between the input terminal IN1 and the diode 111a under the control by the CPU 101a. The switch 112b switches between coupling and decoupling between the input terminal IN2 and the diode 111b under the control by the CPU 101a. Through such a configuration, when a power outage occurs, it is possible to switch driving power for driving the devices included in the internal area 115a, with electric power from the input terminal IN1, electric power from the input terminal IN2, or electric power from both of them.

Figure 8:
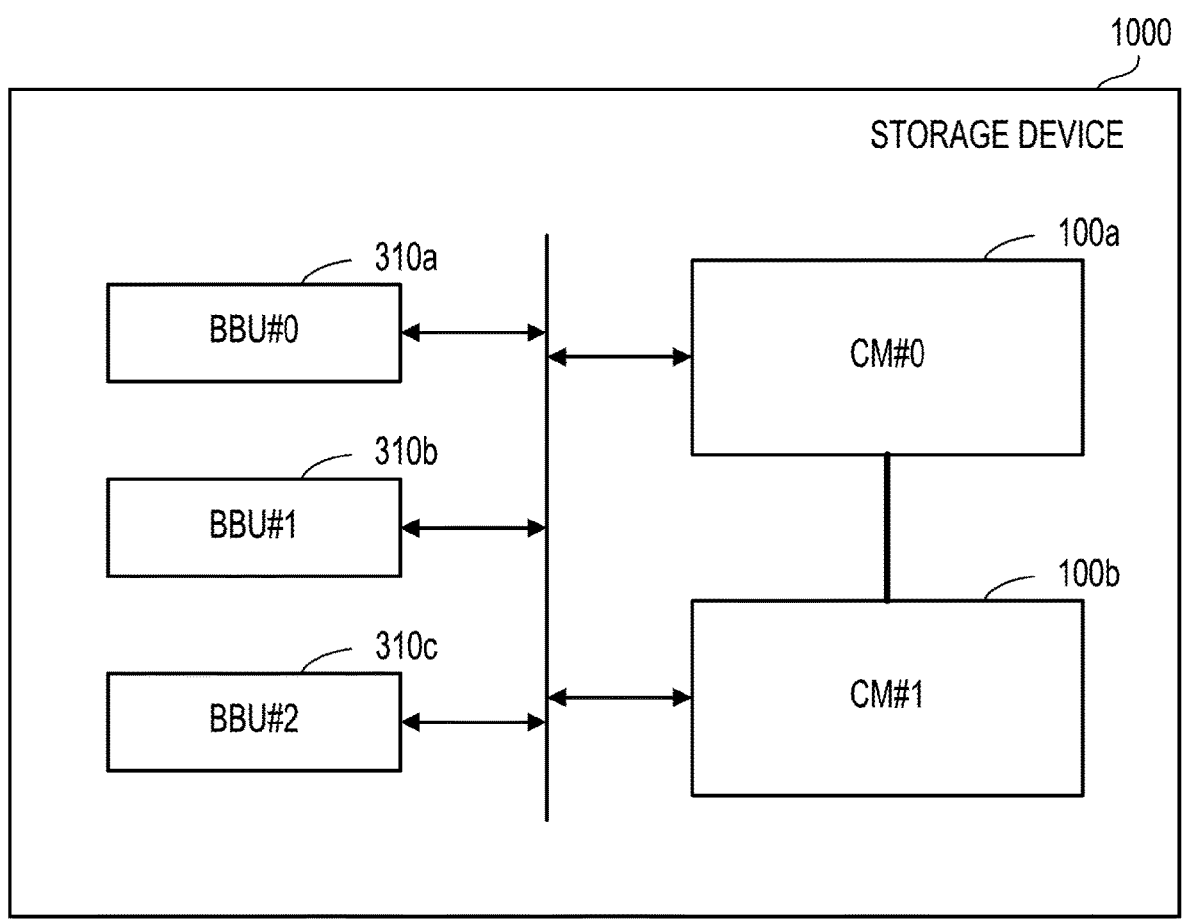
FIG. 8 is a view illustrating a coupling example of a bus for communication in a storage device.

Although not illustrated, the CM 100b also includes the power reception circuit 110 having the same configuration as that of FIG. 7. FIG. 8 is a view illustrating a coupling example of a bus for communication in a storage device. In the present embodiment, the CM 100a and the CM 100b are coupled to each other via, for example, a peripheral component interconnect express (PCIe) bus so as to communicate with each other. For example, each of the CMs 100a and 100b may collect the amount of dirty data included in a cache area of the other CM via the PCIe bus. The CMs 100a and 100b and the BBUs 310a to 310c are coupled to each other via, for example, an I²C (registered mark) bus so as to communicate with each other. For example, the CMs 100a and 100b may acquire the residual battery level of each of the BBUs 310a to 310c via the I²C bus.

Figure 9:
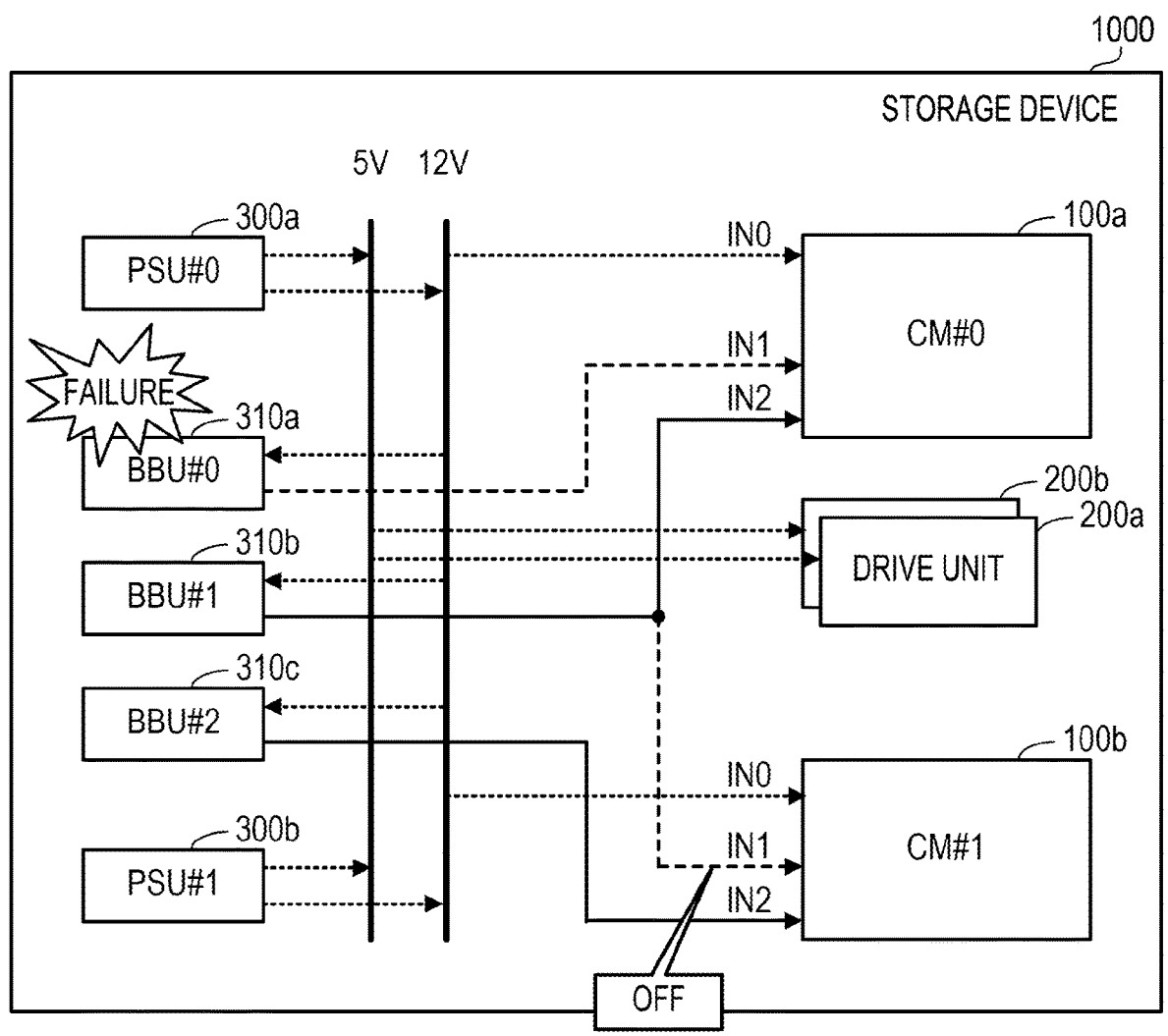
FIG. 9 is a view illustrating a coupling example in a case where a BBU is failed.

Through the above-described configuration illustrated in FIGS. 6 to 8, the following operations are performed in the storage device 1000. FIG. 9 is a view illustrating a coupling example in a case where a BBU is failed. As an example, FIG. 9 illustrates a case where the BBU 310a is failed. In this case, the switches 112a and 112b of the CMs 100a and 100b are controlled as follows.

The CM 100a turns OFF the switch 112a (decoupled state), and turns ON the switch 112b (coupled state). Due to failure of the BBU 310a, the supply of electric power from the BBU 310a to the input terminal IN1 is stopped. Therefore, the switch 112b is turned ON such that the CM 100a may execute a backup processing by electric power supplied from the BBU 310b via the input terminal IN2. The CM 100b turns OFF the switch 112a, and turns ON the switch 112b. Accordingly, the CM 100b may execute a backup processing by electric power supplied from the BBU 310c via the input terminal IN2.

Figure 10:
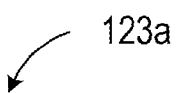
FIG. 10 is a view illustrating an example of a control pattern in a case where a BBU is failed.

FIG. 10 is a view illustrating an example of a control pattern in a case where a BBU is failed. In a control table 123a illustrated in FIG. 10, a control pattern indicating which input terminal included in each of the CM#0 and the CM#1 (the CMs 100a and 100b) is turned ON when which BBU is failed is registered. The CM#0 and the CM#1 control the switches 112a and 112b in accordance with, for example, the control table 123a.

As illustrated in FIG. 10, when the BBU#0 (the BBU 310a) is failed, the CM#0 turns ON the input terminal IN2, and the CM#1 turns ON the input terminal IN2. When the BBU#1 (the BBU 310b) is failed, the CM#0 turns ON the input terminal IN1, and the CM#1 turns ON the input terminal IN2. When the BBU#2 (the BBU 310c) is failed, the CM#0 turns ON the input terminal IN1, and the CM#1 turns ON the input terminal IN1. The phrase "Turns ON the input terminal IN1" indicates that the switch 112a is turned ON, and "turns ON the input terminal IN2" means that the switch 112b is turned ON.

Through such a control, even when any of BBUs is failed, it is possible to supply electric power to each of CMs from individual BBUs. Therefore, even when a BBU is failed, all CMs may execute backup processings while the number of BBUs is suppressed to only one more than the number of CMs. As described below in FIG. 11, in a CM having a smaller amount of dirty data included in a cache area of the CM, a period until a write control mode is switched to a write back mode after power is restored may be shortened.

FIG. 11 is a view illustrating an example of a charge amount in a BBU after power is restored. FIG. 11 illustrates a case where power is restored after a power outage occurs, in a state where the BBU#0 (the BBU 310a) of the storage device 1000 is failed as in the example of FIG. 9. It is assumed that battery capacities of the BBU#0 to the BBU#2 (the BBUs 310a to 310c) are the same. As in the case of FIG. 5, the residual level threshold TH is set to 70% of a battery capacity of each BBU.

Further, as in the case of FIG. 5, it is assumed that the amount of dirty data in the CM#0 is larger than that in the CM#1, and thus electric power corresponding to 70% of the battery capacity is required for a backup processing of the CM#0, and electric power corresponding to 50% of the battery capacity is required for a backup processing of the CM#1. In this case, as illustrated in FIG. 11, after the backup processings are completed, residual battery levels of the BBU#1 and the BBU#2 become 30% and 50%, respectively.

After power is restored, an amount required for charging the BBU#1 (required charge amount) becomes 40% (=70%-30%), which is the same as the required charge amount of the BBU#0 as illustrated in FIG. 5. After power is restored, an amount required for charging the BBU#2 (required charge amount) becomes 20% (=70%-50%), which is the same as the required charge amount of the BBU#1 as illustrated in FIG. 5. Thus, in each of the CM#0 and the CM#1, as in the case of FIG. 5, as compared to the CM#0, in the CM#1, a period until a write control mode is switched to a write back mode from power restoration becomes shorter.

Hereinafter, an addition of CM will be described. In the above storage device 1000, every time one CM is added, one BBU may also be added. Hereinafter, descriptions will be made on an example of a case where two CMs are added to the storage device 1000.

Figure 12:
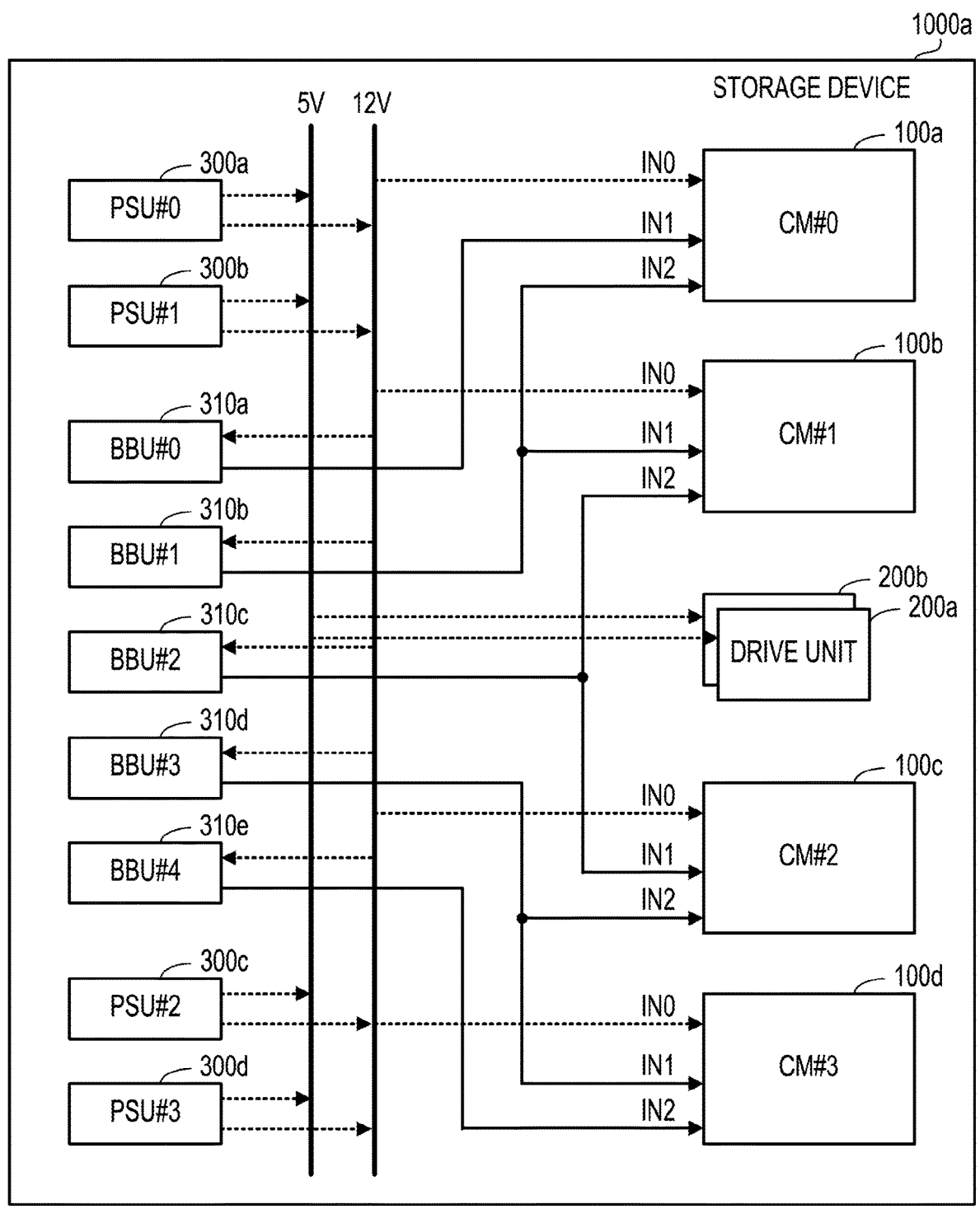
FIG. 12 is a view illustrating a coupling example of BBUs after CMs are added.

FIG. 12 is a view illustrating a coupling example of BBUs after CMs are added. In FIG. 12, the storage device 1000 in a state where two CMs 100c and 100d (CM#2 and CM#3) are added is described as "a storage device 1000a." As the CMs 100c and 100d are added, two BBUs 310d and 310e (BBU#3 and the BBU#4) are added in the storage device 1000a.

Each of the CMs 100c and 100d also includes input terminals IN0 to IN2 as in each of the CMs 100a and 100b. Like each of the CMs 100a and 100b, each of the CMs 100c and 100d also includes a power reception circuit 110 illustrated in FIG. 7, and inputs from the input terminals IN1 and IN2 may be turned ON/OFF by the power reception circuit 110.

The wiring between the CMs 100a to 100d and the BBUs 310a to 310e is made as follows. The output of the BBU 310a is coupled to the input terminal IN1 of the CM 100a. The output of the BBU 310b is coupled to both the input terminal IN2 of the CM 100a and the input terminal IN1 of the CM 100b. The output of the BBU 310c is coupled to both the input terminal IN2 of the CM 100b and the input terminal IN1 of the CM 100c. The output of the BBU 310d is coupled to both the input terminal IN2 of the CM 100c, and the input terminal IN1 of the CM 100d. The output of the BBU 310e is coupled to the input terminal IN2 of the CM 100d.

In FIG. 12, as an example, a PSU 300c and a PSU 300d are also added. 12V-electric power from the PSUs 300a to 300d is supplied to the added BBUs 310d and 310e as well as the BBUs 310a to 310c. Accordingly, in a state where electric power is normally supplied from an external power source, the BBUs 310a to 310e are charged with the 12V-electric power.

Figure 13:
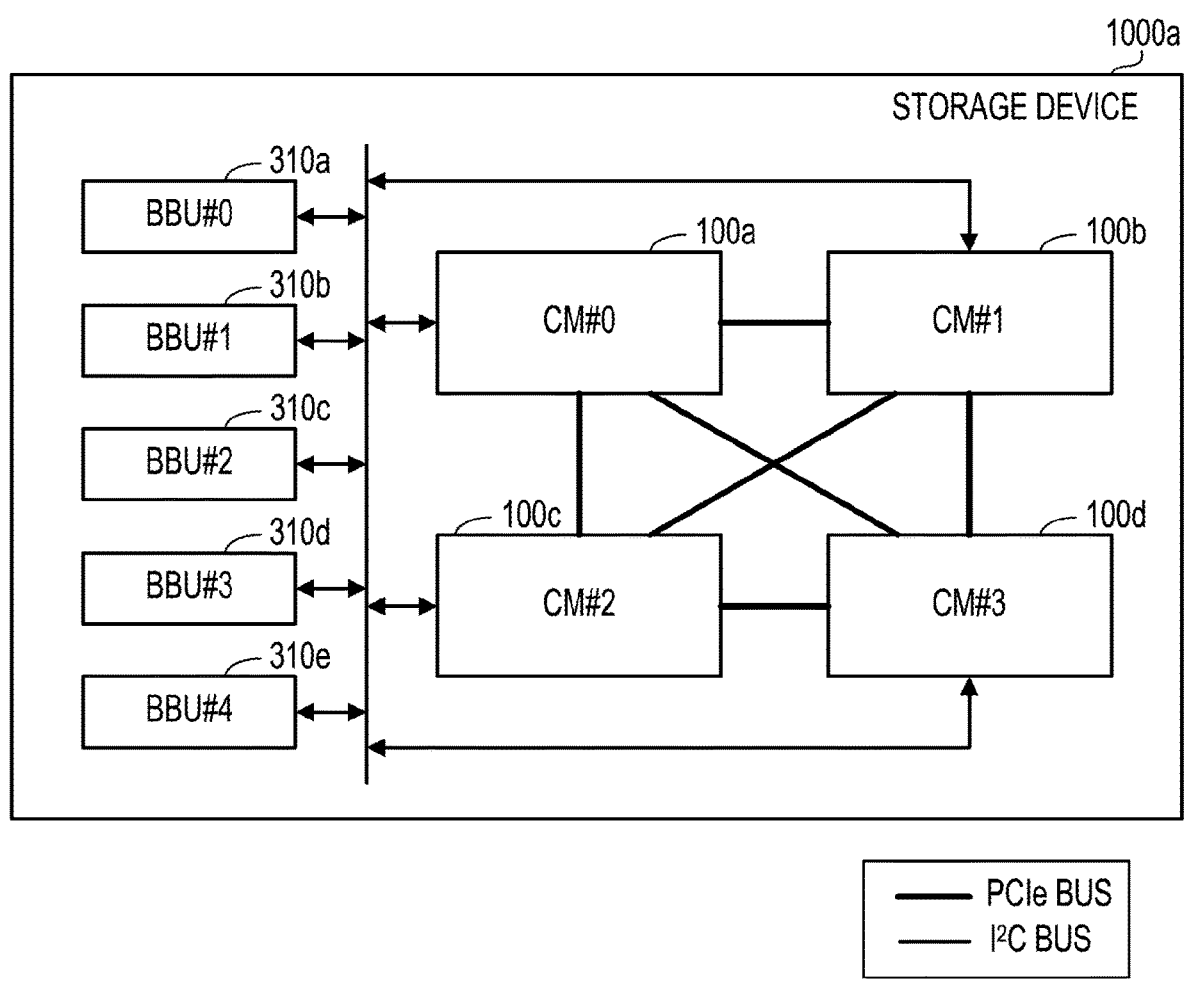
FIG. 13 is a view illustrating a coupling example of a bus for communication after CMs are added.

FIG. 13 is a view illustrating a coupling example of a bus for communication after CMs are added. The CMs 100a to 100*d* are coupled to each other via a PCIe bus so as to communicate with each other. For example, each of the CMs 100*a* to 100*d* may collect the amount of dirty data included in a cache area of the other CM via the PCIe bus. The CMs 100*a* to 100*d* and the BBUs 310*a* to 310*e* are coupled to each other via an I²C bus so as to communicate with each other. For example, the CMs 100*a* to 100*d* may acquire the residual battery level of each of the BBUs 310*a* to 310*e* via the I²C bus.

FIG. 14 is a view illustrating an example of a control pattern in a case where a BBU is failed. In a control table 123*b* illustrated in FIG. 14, a control pattern indicating the input terminal included in each of the CM#0 to the CM#3 (the CMs 100*a* to 100*d*) to be turned ON when a BBU is failed in the storage device 1000*a* is registered. After the CM#2 and the CM#3 are added, the CM#0 to the CM#3 control the switches 112*a* and 112*b* in accordance with, for example, the control table 123*b*.

As illustrated in FIG. 14, when the BBU#0 (the BBU 310*a*) is failed, each of the CM#0 to the CM#3 turns ON the input terminal IN2. When the BBU#1 (the BBU 310*b*) is failed, the CM#0 turns ON the input terminal IN1, and each of the CM#1 to the CM#3 turns ON the input terminal IN2. When the BBU#2 (the BBU 310*c*) is failed, each of the CM#0 and the CM#1 turns ON the input terminal IN1, and each of the CM#2 and the CM#3 turns ON the input terminal IN2. When the BBU#3 (the BBU 310*d*) is failed, each of the CM#0 to the CM#2 turns ON the input terminal IN1, and the CM#3 turns ON the input terminal IN2. When the BBU#4 (the BBU 310*e*) is failed, each of the CM#0 to the CM#3 turns ON the input terminal IN1.

Through such a control, as in the case before an addition of the CM#2 and the CM#3, even when any of BBUs is failed, it is possible to supply electric power to each of CMs from individual BBUs. Therefore, even when a BBU is failed, all CMs may execute backup processings while the number of BBUs is suppressed to only one more than the number of CMs. In a CM having a smaller amount of dirty data included in a cache area of the CM, a period until a write control mode is switched to a write back mode after power is restored may be shortened.

However, in the storage devices 1000 and 1000*a* as configured above, in a case where no BBU is failed, one BBU becomes a surplus when electric power is individually supplied from one BBU to one CM. Meanwhile, as the amount of dirty data included in a cache area of a CM increases, the time for a backup processing becomes longer, and then the residual battery level of a BBU becomes smaller after the backup processing is completed. Then, the time until the residual battery level reaches the residual level threshold TH after power is restored becomes longer, and then a period until a write control mode is switched to a write back mode becomes longer.

Therefore, in the present embodiment, when no BBU is failed, electric power of the surplus BBU is supplied to a CM having a maximum amount of dirty data. Accordingly, since electric power from two BBUs is supplied to the corresponding CM, the amount of each of these two BBUs discharged by a backup processing may be reduced to ½ of a case where one BBU is used. As a result, it is possible to shorten a period until a write control mode is switched to a write back mode after power is restored.

Figure 15:
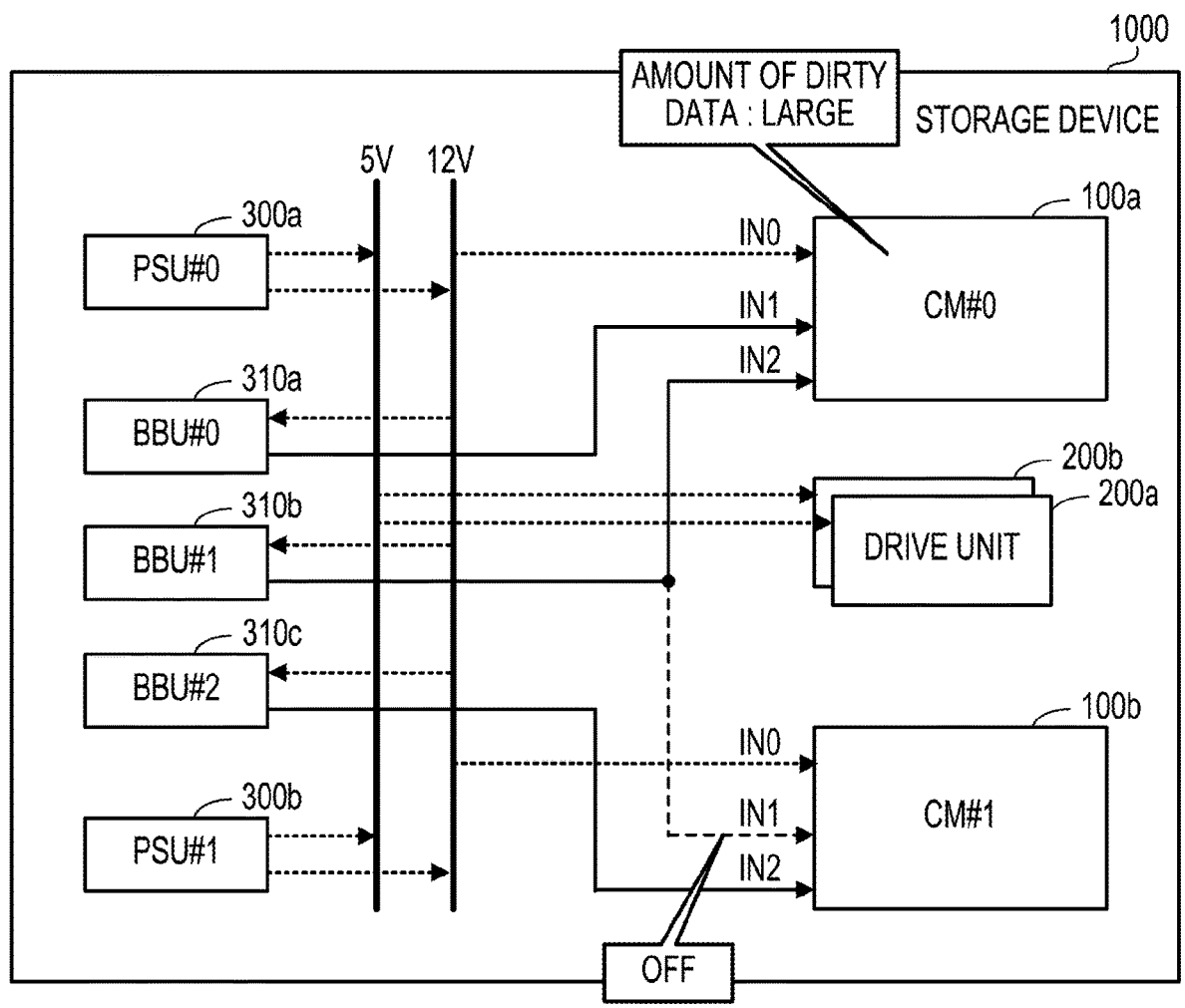
FIG. 15 is a view illustrating a coupling example in a case where no BBU is failed.

FIG. 15 is a view illustrating a coupling example in a case where no BBU is failed. FIG. 15 illustrates a case where all of the BBUs 310*a* to 310*c* normally operate in the storage device 1000 illustrated in FIG. 6. It is assumed that the amount of dirty data included in a cache area of the CM 100*a* is larger than that of dirty data included in a cache area of the CM 100*b*. In this state, when a power outage occurs, the switches 112*a* and 112*b* of the CMs 100*a* and 100*b* are controlled as follows.

The CM 100*a* having a maximum amount of dirty data turns ON both the switches 112*a* and 112*b*. Accordingly, electric power is supplied from both the BBUs 310*a* and 310*b* to the CM 100*a* via the input terminals IN1 and IN2. Thus, power consumption of each of the BBUs 310*a* and 310*b* in a backup processing in the CM 100*a* becomes ½ of the case where one BBU is used. Meanwhile, the CM 100*b* turns OFF the switch 112*a*, and turns ON the switch 112*b*. Accordingly, the CM 100*b* executes a backup processing by electric power supplied from the BBU 310*c* via the input terminal IN2.

FIG. 16 is a view illustrating an example of a charge amount in a BBU after power is restored. FIG. 16 illustrates a case where power is restored after a power outage occurs, in a state where none of the BBU#0 to the BBU#2 (the BBUs 310*a* to 310*c*) of the storage device 1000 are failed as in the example of FIG. 15. It is assumed that battery capacities of the BBU#0 to the BBU#2 are the same. As in the case of FIG. 11, the residual level threshold TH is set to 70% of a battery capacity of each BBU.

Further, as in the case of FIG. 11, it is assumed that the amount of dirty data in the CM#0 is larger than that in the CM#1, and thus electric power corresponding to 70% of the battery capacity is required for a backup processing of the CM#0, and electric power corresponding to 50% of the battery capacity is required for a backup processing of the CM#1. Then, as illustrated in FIG. 15, it is assumed that electric power from the BBU#0 and the BBU#1 is supplied to the CM#0, and electric power from the BBU#2 is supplied to the CM#1.

In this case, as illustrated in FIG. 16, after the backup processing is completed, since the residual battery level of the BBU#2 becomes 50%, an amount required for charging the BBU#2 (required charge amount) becomes 20% (=70%–50%) after power is restored. Therefore, in the CM#1, a period until a write control mode is switched to a write back mode from power restoration corresponds to a time required for charging 20%, which is the same as that in the case of FIG. 11.

Meanwhile, after the backup processing is completed, the residual battery level of each of the BBU#0 and the BBU#1 becomes 65% (=100%–70%/2). Therefore, an amount required for charging each of the BBU#0 and the BBU#1 (required charge amount) becomes 5% (=70%–65%) after power is restored. Accordingly, in the CM#0, a period until a write control mode is switched to a write back mode from power restoration corresponds to a time required for charging 5%, which is considerably shorter than that of the case of FIG. 11 where 20% of charging is required. As a result, a response performance to a write request from the host device 1100 may be recovered in a short time from power restoration.

Figure 17:
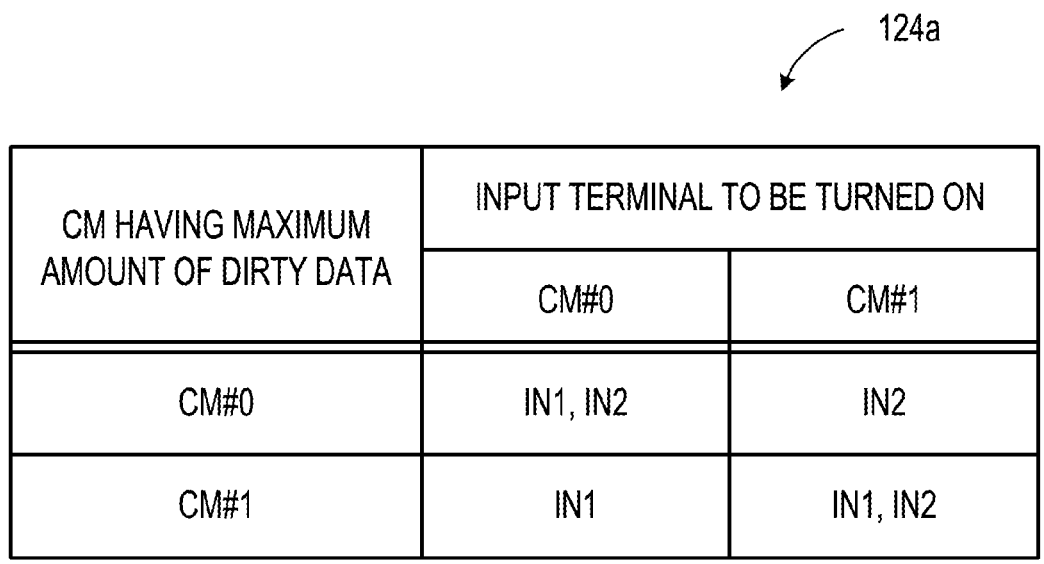
FIG. 17 is a view illustrating an example of a control pattern in a case where no BBU is failed.

FIG. 17 is a view illustrating an example of a control pattern in a case where no BBU is failed. In a control table 124*a* illustrated in FIG. 17, a control pattern indicating the input terminal included in each of the CM#0 and the CM#1 (the CMs 100*a* and 100*b*) to be turned ON when a CM has a maximum amount of dirty data is registered. The CM#0 and the CM#1 control the switches 112*a* and 112*b* in accordance with, for example, the control table 124*a*.

As illustrated in FIG. 17, when the CM#0 has a maximum amount of dirty data, the CM#0 turns ON both the input terminals IN1 and IN2 and the CM#1 turns ON only the input terminal IN2. Meanwhile, when the CM#1 has a maximum amount of dirty data, the CM#0 turns ON only the input terminal IN1, and the CM#1 turns ON both the input terminals IN1 and IN2. Through such a control, for a CM having a maximum amount of dirty data, it is possible to shorten a period until a write control mode is switched to a write back mode from power restoration.

FIG. 18 is a view illustrating another example of a control pattern in a case where no BBU is failed. FIG. 18 illustrates a control pattern in a case where no BBU is failed, in the storage device 1000a illustrated in FIG. 12, in which four CMs of the CM#0 to the CM#3 (the CMs 100a to 100d) and five BBUs of the BBU#0 to the BBU#4 (the BBUs 310a to 310e) are included.

That is, in a control table 124b illustrated in FIG. 18, a control pattern indicating the input terminal included in each of the CM#0 to the CM#3 to be turned ON when a CM has a maximum amount of dirty data is registered. The CM#0 to the CM#3 control the switches 112a and 112b in accordance with, for example, the control table 124b.

As illustrated in FIG. 18, when the CM#0 has a maximum amount of dirty data, the CM#0 turns ON both the input terminals IN1 and IN2, and each of the CM#1 to the CM#3 turns ON only the input terminal IN2. When the CM#1 has a maximum amount of dirty data, the CM#0 turns ON only the input terminal IN1, the CM#1 turns ON both the input terminals IN1 and IN2, and each of the CM#2 and the CM#3 turns ON only the input terminal IN2. When the CM#2 has a maximum amount of dirty data, each of the CM#0 and the CM#1 turns ON only the input terminal IN1, the CM#2 turns ON both the input terminals IN1 and IN2, and the CM#3 turns ON only the input terminal IN2. When the CM#3 has a maximum amount of dirty data, each of the CM#0 to the CM#2 turns ON only the input terminal IN1, and the CM#3 turns ON both the input terminals IN1 and IN2.

Through the above-described control, it is possible for a CM having a maximum amount of dirty data to shorten a period until a write control mode is switched to a write back mode from power restoration even when the number of CMs increases.

Figure 19:
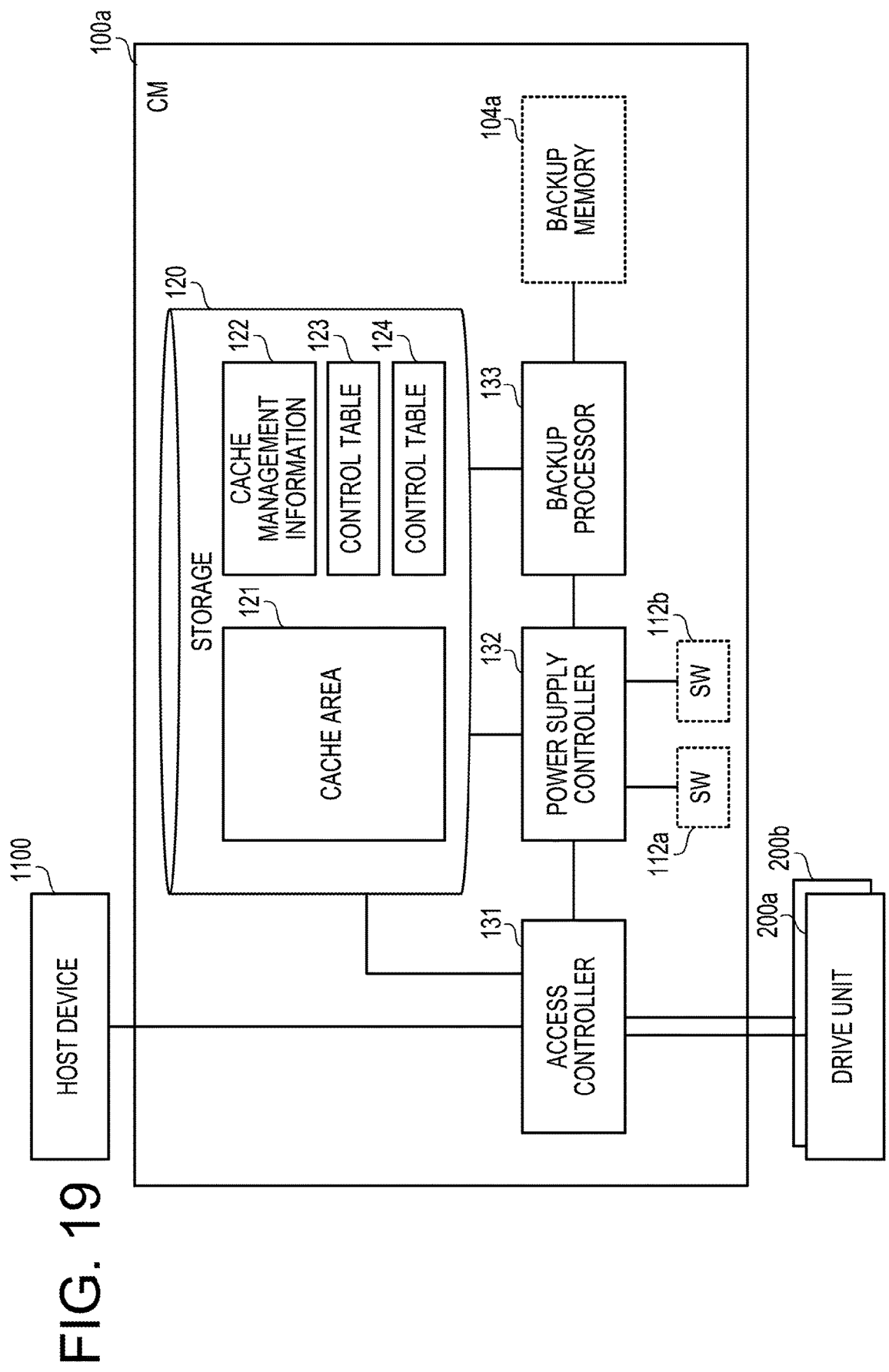
FIG. 19 is a block diagram illustrating a configuration example of processing functions included in a CM.

Next, descriptions will be made on details of a processing of each CM. FIG. 19 is a block diagram illustrating a configuration example of processing functions included in a CM. In FIG. 19, as an example, the CM 100a will be described, but each of the CMs 100b to 100d also has the same processing functions as the CM 100a.

The CM 100a includes a storage 120, an access controller 131, a power supply controller 132, and a backup processor 133. The storage 120 is implemented by a storage area of the RAM 102a. Processings of the access controller 131, the power supply controller 132, and the backup processor 133 are implemented when, for example, the CPU 101a executes a predetermined program.

In the storage 120, a cache area 121 used in an access control on a logical volume is secured. In the storage 120, cache management information 122 and control tables 123 and 124 are stored.

The cache management information 122 is information used to manage a usage status of the cache area 121. The cache management information 122 includes, for example, an entry for each cache page within the cache area 121. In each entry, information on data stored in the cache page is registered. For example, in each entry, information indicating which address of which logical volume the data stored in the cache page belongs to, flag information indicating whether the data is dirty data, etc. is registered. In this case, a determination of whether the data within the cache area 121 is dirty data is made on a cache page basis.

The control table 123 holds information indicating a control pattern (i.e., ON/OFF patterns of the input terminals IN1 and IN2) of the switches 112a and 112b in a case where a BBU is failed. For example, when two CMs are mounted in a storage device, the control table 123a illustrated in FIG. 10 is stored as the control table 123. When four CMs are mounted in the storage device, the control table 123b illustrated in FIG. 14 is stored as the control table 123.

The control table 124 holds information indicating a control pattern of the switches 112a and 112b in a case where no BBU is failed. For example, when two CMs are mounted in the storage device, the control table 124a illustrated in FIG. 17 is stored as the control table 124. When four CMs are mounted in the storage device, the control table 124b illustrated in FIG. 18 is stored as the control table 124.

In the present embodiment, it is assumed that the control tables 123 and 124 having common contents are stored in storages of all CMs mounted in the storage device. The access controller 131 controls an access to a predetermined logical volume by using the cache area 121, in response to a request from the host device 1100. The access controller 131 controls writing to the logical volume in a write back mode in a state where electric power is normally supplied from an external power source. For example, when writing of data to the logical volume is requested from the host device 1100, the access controller 131 writes write data in the cache area 121, and gives a response of writing completion to the host device 1100. Then, thereafter, at a predetermined timing, the access controller 131 writes the write data written in the cache area 121, in a storage area corresponding to the logical volume among storage areas of HDDs within the drive units 200a and 200b.

Immediately after a restoration from power outage, the access controller 131 controls writing to the logical volume in a write through mode. For example, when writing of data to the logical volume is requested from the host device 1100, the access controller 131 writes write data not only in the cache area 121, but also in a storage area corresponding to the logical volume among storage areas of HDDs within the drive units 200a and 200b. After this writing is completed, the access controller 131 gives a response of writing completion to the host device 1100.

The power supply controller 132 periodically monitors an operation status of all BBUs mounted in the storage device, and an operation status of all other CMs mounted in the storage device. The power supply controller 132 periodically collects amounts of dirty data from all the CMs mounted in the storage device, including the CM 100a. The power supply controller 132 controls the switches 112a and 112b based on the operation statuses of the BBUs and the CMs or the dirty data amount of each CM. Accordingly, a control is performed as to which of the input terminals IN1 and IN2 is used to supply electric power.

At the time of returning from power outage, the power supply controller 132 monitors a residual battery level of a BBU as a power supply source. When the residual battery level reaches a residual level threshold TH, the power supply controller 132 notifies the backup processor 133 of such a point.

At the time of power outage, the backup processor 133 copies dirty data among cache data pieces stored in the cache area 121 to the backup memory 104a. At the time of returning from power outage, the backup processor 133 writes the dirty data stored in the backup memory 104a in the storage areas of the drive units 200a and 200b.

Figure 20:
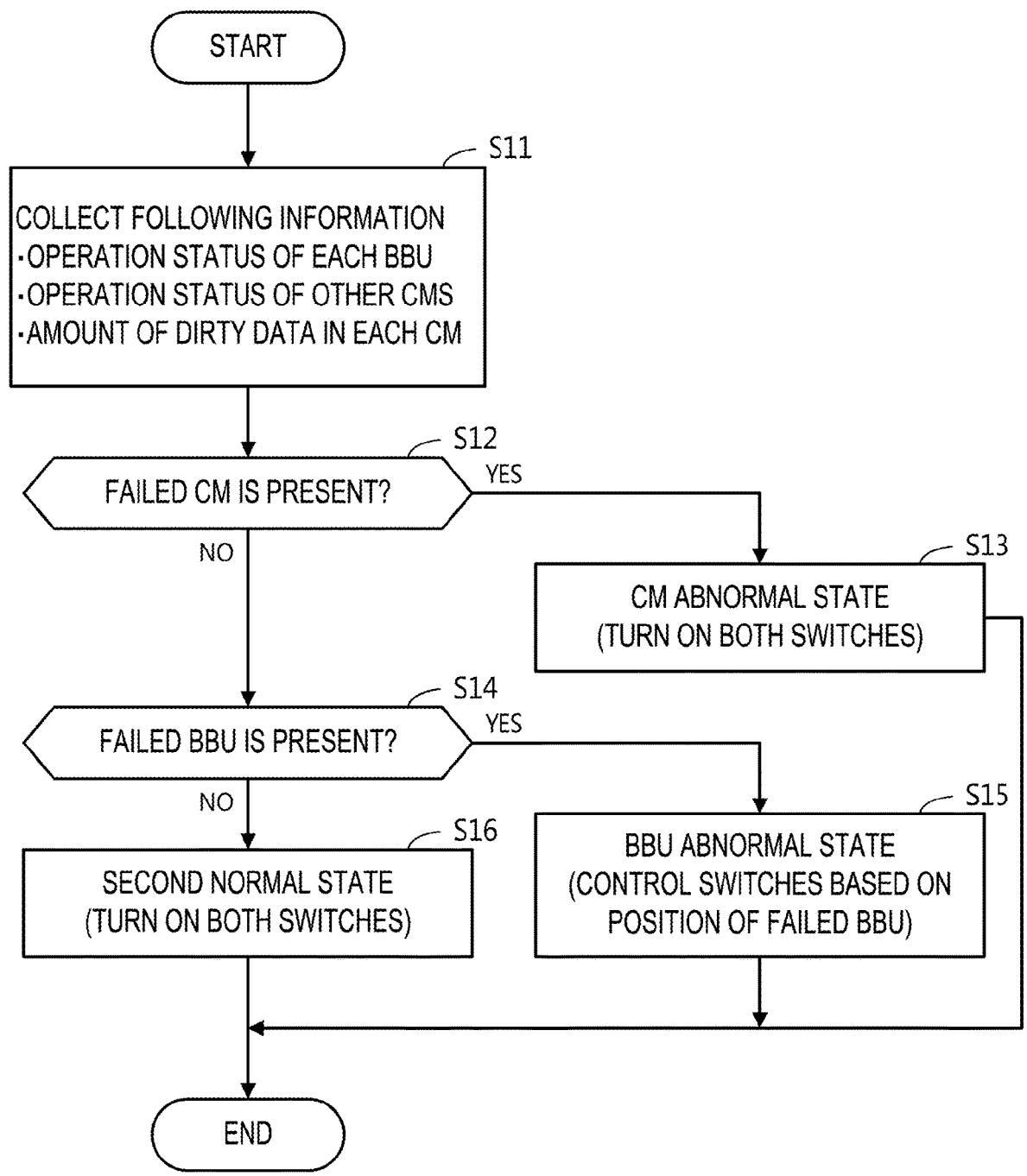
FIG. 20 is an example of a flowchart illustrating a processing procedure of a CM in a first normal state.

Next, a processing of the CM 100a will be described by using a flowchart. Each of the CMs 100b to 100d also executes the same processing as the CM 100a. First, FIG. 20 is an example of a flowchart illustrating a processing procedure of a CM in a first normal state. The first normal state indicates a state in which electric power is normally supplied from an external power source. The CM 100a executes the processing illustrated in FIG. 20 at regular time intervals in the first normal state. It is assumed that status information indicating a status of devices within a storage device is set in the storage 120.

(Step S11) The power supply controller 132 collects information indicating an operation status of all BBUs mounted in a storage device. For example, the power supply controller 132 transmits information for survival confirmation to each BBU via an I²C bus, and then determines that the BBU is normally operating when it is possible to receive a response to the information.

The power supply controller 132 collects information indicating an operation status of all other CMs mounted in the storage device. For example, the power supply controller 132 transmits information for survival confirmation to each CM via a PCIe bus, and then determines that the CM is normally operating when it is possible to receive a response to the information.

Further, the power supply controller 132 collects amounts of dirty data included in cache areas from all the CMs mounted in the storage device, including the CM 100a, and writes the amounts in the storage 120. For example, the power supply controller 132 requests that all other CMs transmit dirty data amounts, via the PCIe bus. Upon receiving the request, a CM calculates a dirty data amount based on the cache management information 122 of its own device, and transmits the dirty data amount to the CM 100a. The power supply controller 132 of the CM 100a also calculates a dirty data amount of the CM 100a based on the cache management information 122 of the CM 100a.

(Step S12) The power supply controller 132 determines whether a failed CM is present, based on the information collected in step S11, the information indicating the operation status of the CMs. The power supply controller 132 executes a processing in step S13 when one CM is failed, and executes a processing in step S14 when no CM is failed.

(Step S13) The power supply controller 132 updates the status information set in the storage 120, so as to indicate a CM abnormal state in which a CM is failed. Then, the power supply controller 132 turns ON both the switches 112a and 112b within the CM 100a.

(Step S14) The power supply controller 132 determines whether a failed BBU is present, based on the information collected in step S11, the information indicating the operation status of the BBUs. The power supply controller 132 executes a processing in step S15 when one BBU is failed, and executes a processing in step S16 when no BBU is failed.

(Step S15) The power supply controller 132 updates the status information set in the storage 120, so as to indicate a BBU abnormal state in which a BBU is failed. Then, the power supply controller 132 controls the switches 112a and 112b within the CM 100a based on the position of the failed BBU (which BBU is failed). Here, the power supply controller 132 determines whether to turn ON or OFF each of the switches 112a and 112b based on the control table 123.

(Step S16) The power supply controller 132 updates the status information set in the storage 120 so as to indicate a second normal state in which neither a CM nor a BBU is failed. Then, the power supply controller 132 turns ON both the switches 112a and 112b within the CM 100a.

Since electric power is supplied from a PSU, even when a switch is turned ON in steps S13, S15, and S16, electric power of a BBU coupled to the switch is not consumed.

Figure 21:
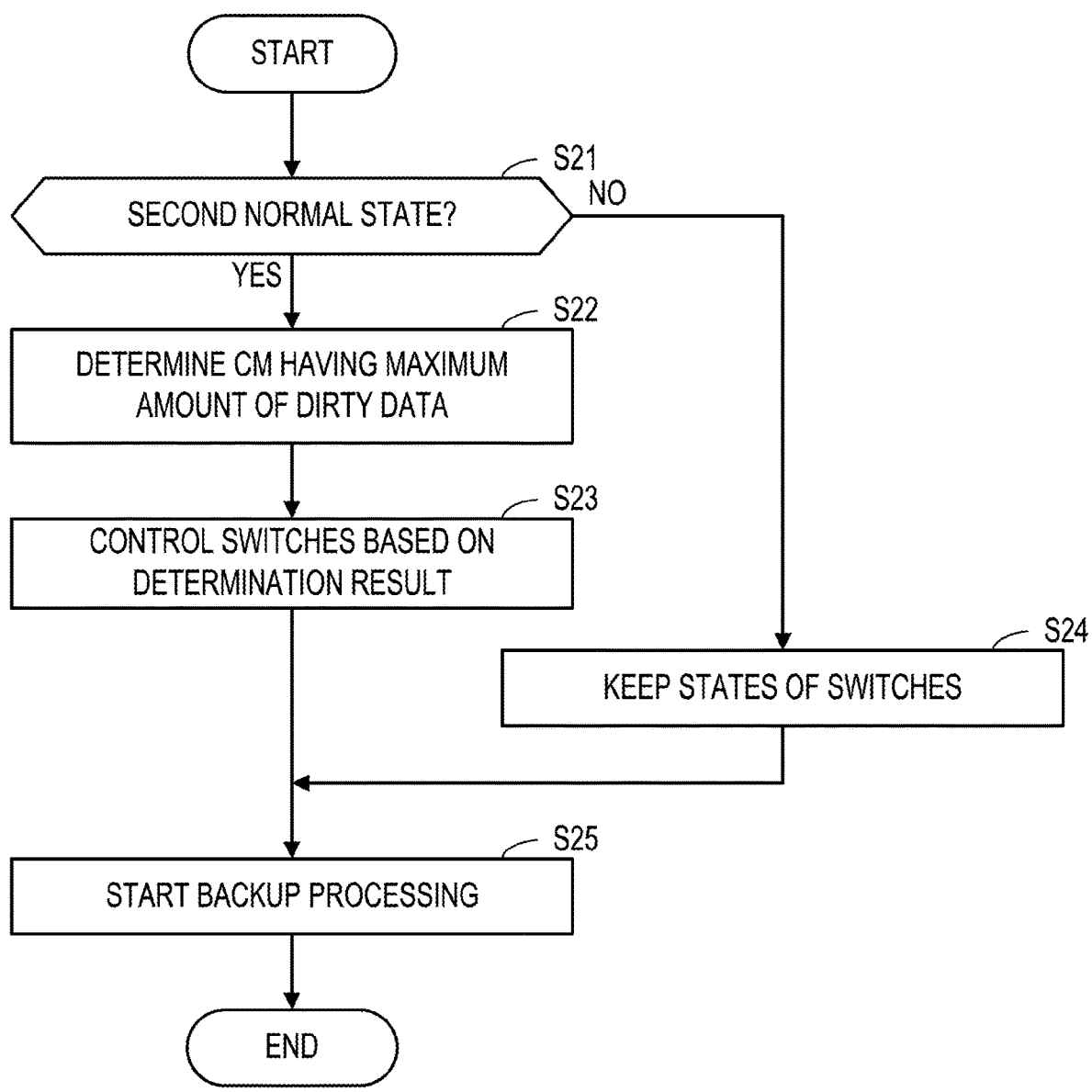
FIG. 21 is an example of a flowchart illustrating a processing procedure of a CM when a power outage occurs.

FIG. 21 is an example of a flowchart illustrating a processing procedure of a CM when a power outage occurs. When the power supply controller 132 of the CM 100a detects that supply of power from a PSU is decoupled, the processing in FIG. 21 is executed.

(Step S21) The power supply controller 132 determines whether a current state of the CM 100a is a second normal state based on the status information set in the storage 120. The power supply controller 132 executes a processing in step S22 when the current state is the second normal state, and executes a processing in step S24 when the current state is not the second normal state (when the current state is a CM abnormal state or a BBU abnormal state).

(Step S22) The power supply controller 132 determines a CM having a maximum amount of dirty data based on the information collected through the recently executed processing in step S11 of FIG. 20.

(Step S23) The power supply controller 132 controls the switches 112a and 112b within the CM 100a based on the result of determination in step S22. Here, the power supply controller 132 determines whether to turn ON or OFF each of the switches 112a and 112b based on the control table 124.

(Step S24) The power supply controller 132 keeps the states of the switches 112a and 112b controlled in step S13 or step S15 of FIG. 20.

(Step S25) The power supply controller 132 instructs the backup processor 133 to start a backup processing. In accordance with the instruction, the backup processor 133 transfers and saves dirty data among cache data pieces of the cache area 121, from the storage 120 (the RAM 102a) to the backup memory 104a. Here, the backup processor 133 extracts the dirty data among the cache data pieces within the cache area 121 based on the cache management information 122. The power supply controller 132 also transfers and saves the cache management information 122 and the control tables 123 and 124 to the backup memory 104a.

Figure 22:
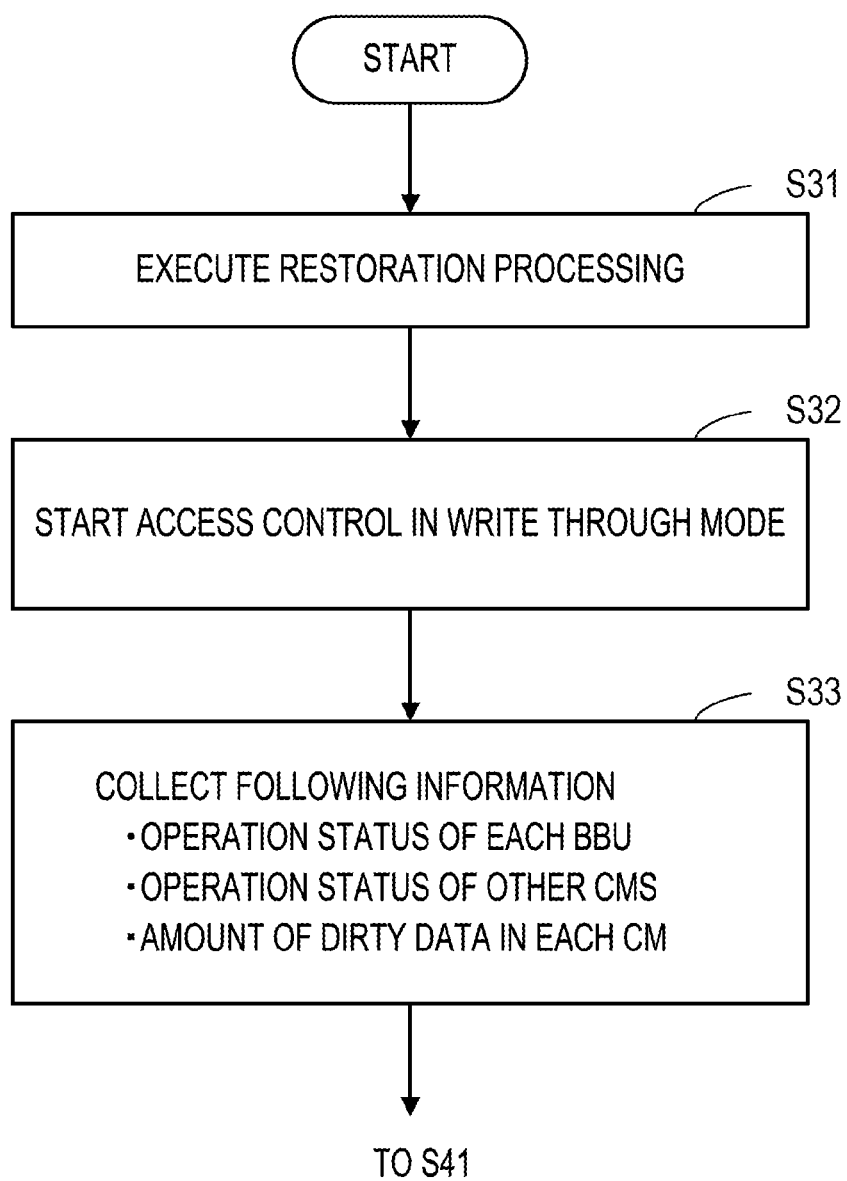
FIG. 22 is an example (first) of a flowchart illustrating a processing procedure of a CM at the time of power restoration.
Figure 23:
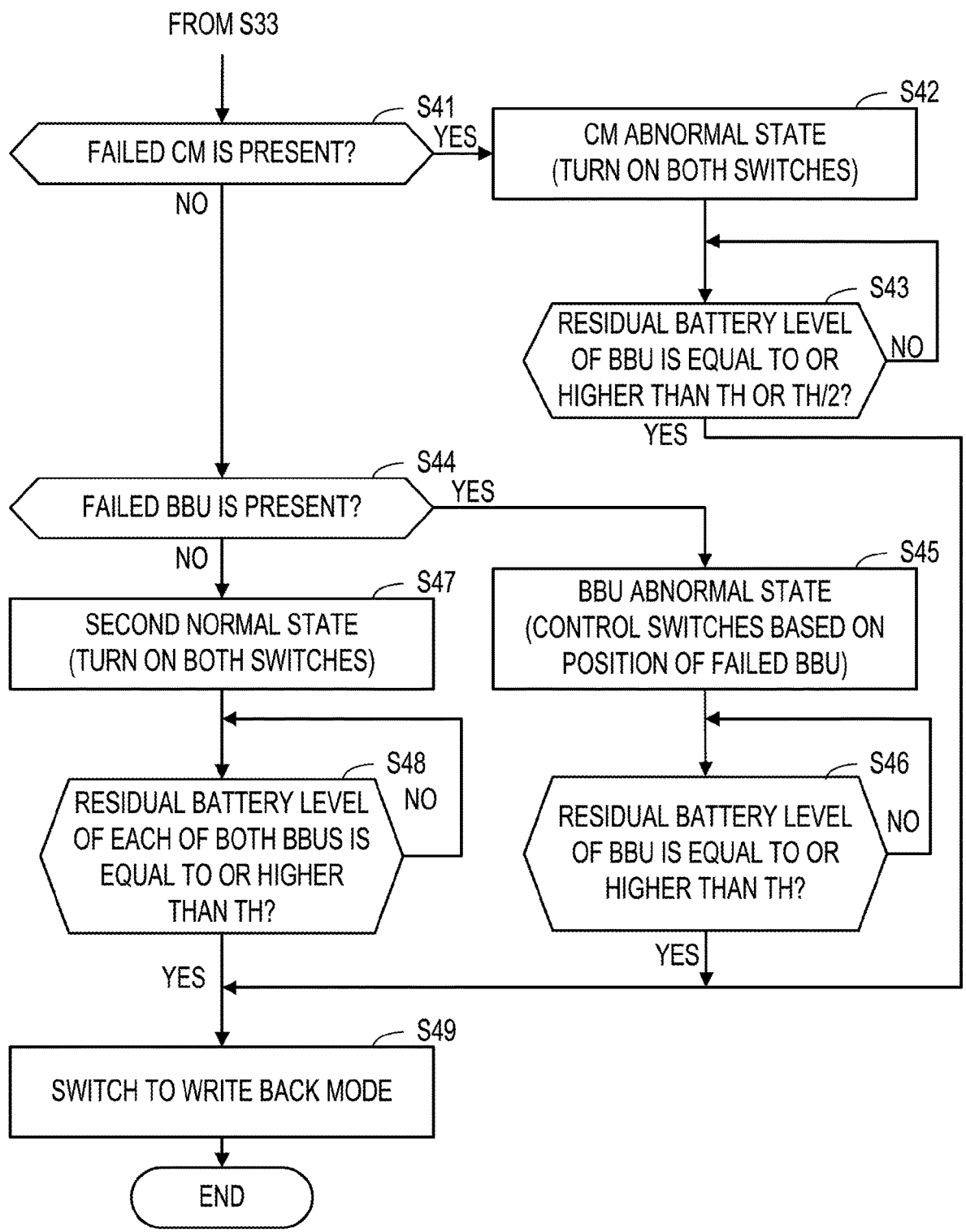
FIG. 23 is an example (second) of a flowchart illustrating a processing procedure of a CM at the time of power restoration.

When the backup processing is completed, the CM 100a is shut down. FIGS. 22 and 23 are examples of flowcharts illustrating a processing procedure of a CM at the time of power restoration. When the supply of electric power from an external power source is restored, the supply of electric power from a PSU is resumed. When activated by the electric power from the PSU, the CM 100a executes the processing in FIG. 22.

(Step S31) The backup processor 133 executes a restoration processing of the data saved in the backup memory 104a. Specifically, the backup processor 133 re-writes the cache management information 122 and the control tables 123 and 124 backed up in the backup memory 104a, in the storage 120 (the RAM 102a). With reference to the cache management information 122, the backup processor 133 writes the dirty data saved in the backup memory 104a at a predetermined position in storage areas of the drive units 200a and 200b.

(Step S32) When the restoration processing is completed, such a fact is transferred to the access controller 131 through the power supply controller 132. The access controller 131 starts an access control on a logical volume in accordance with a request from the host device 1100. Here, the access controller 131 executes a write control in a write through mode.

(Step S33) The power supply controller 132 collects information indicating each of an operation status of all BBUs mounted in the storage device and an operation status of all other CMs mounted in the storage device, and amounts of dirty data included in cache areas from all the CMs mounted in the storage device, including the CM 100*a* in the same procedure as that in step S11 of FIG. 20.

Thereafter, the processing in FIG. 23 is executed.

(Step S41) The power supply controller 132 determines whether a failed CM is present, based on the information collected in step S33, the information indicating the operation status of the CMs. The power supply controller 132 executes a processing in step S42 when one CM is failed, and executes a processing in step S44 when no CM is failed.

(Step S42) The power supply controller 132 sets status information indicating a CM abnormal state in which a CM is failed, in the storage 120. Then, the power supply controller 132 turns ON both the switches 112*a* and 112*b* within the CM 100*a*.

(Step S43) The power supply controller 132 acquires a residual battery level of a BBU that is capable of supplying electric power to the CM 100*a*, from the BBU. The power supply controller 132 determines whether the acquired residual battery level is equal to or higher than a predetermined threshold. Then, when the residual battery level does not reach the threshold, the power supply controller 132 waits for a predetermined time, and then executes the processing in step S43 again. Then, when the acquired residual battery level is equal to or higher than the threshold, the power supply controller 132 executes a processing in step S49.

Here, the phrase "the BBU capable of supplying electric power to the CM 100*a*" indicates a BBU coupled to an input terminal corresponding to a switch that is turned ON. Since, in step S42, both the switches 112*a* and 112*b* are turned ON, in step S43, residual battery levels of the BBUs 310*a* and 310*b* coupled to the input terminals IN1 and IN2, respectively, are acquired.

The threshold used for determination is determined depending on a state of an adjacent CM. The adjacent CM refers to a CM having an identification number larger or smaller than the CM 100*a* by one, when identification numbers are sequentially given to respective CMs mounted in the storage device. For example, it is assumed that, as illustrated in FIG. 12, the CMs 100*a* to 100*d* and the BBUs 310*a* to 310*e* are coupled, and identification numbers are given in the order of the CMs 100*a*, 100*b*, 100*c*, and 100*d*. In this case, the CM 100*a* is adjacent to the CM 100*b*, the CM 100*b* is adjacent to the CMs 100*a* and 100*c*, the CM 100*c* is adjacent to the CMs 100*b* and 100*d*, and the CM 100*d* is adjacent to the CM 100*c*.

A BBU shared by an adjacent CM is coupled to at least one of the input terminals IN1 and IN2 included in a CM. For example, the BBU 310*b* shared by the CM 100*b* as an adjacent CM is coupled to the input terminal IN2 of the CM 100*a*. In this case, when the CM 100*b* as the adjacent CM is failed, electric power from the BBU 310*b* is supplied to only the CM 100*a*. In this state, electric power may be exclusively supplied to the CM 100*a* from both the BBUs 310*a* and 310*b* coupled to the input terminals IN1 and IN2, respectively. Thus, when the residual battery level of each of the BBUs 310*a* and 310*b* reaches ½ of the above-described residual level threshold TH, the CM 100*a* may reliably execute a backup processing at the time of power outage.

Therefore, in step S43, when an adjacent CM is failed, it is determined whether the residual battery level is equal to or higher than TH/2, and when the adjacent CM is not failed, it is determined whether the residual battery level is equal to or higher than TH. In step S43, since two BBUs capable of supplying electric power to a CM are present, it is determined whether the residual battery level of each of these two BBUs is equal to or higher than the threshold.

(Step S44) The power supply controller 132 determines whether a failed BBU is present, based on the information collected in step S33, the information indicating the operation status of the BBUs. The power supply controller 132 executes a processing in step S45 when one BBU is failed, and executes a processing in step S47 when no BBU is failed.

(Step S45) The power supply controller 132 sets status information indicating a BBU abnormal state in which a BBU is failed, in the storage 120. Then, the power supply controller 132 controls the switches 112*a* and 112*b* within the CM 100*a* based on the position of the failed BBU (which BBU is failed). Here, the power supply controller 132 determines whether to turn ON or OFF each of the switches 112*a* and 112*b* based on the control table 123.

(Step S46) The power supply controller 132 acquires a residual battery level of a BBU that is capable of supplying electric power to the CM 100*a*, from the BBU. Since in step S46, a BBU is failed, only one BBU is capable of supplying electric power to the CM 100*a*. The power supply controller 132 determines whether the acquired residual battery level is equal to or higher than the residual level threshold TH. Then, when the residual battery level does not reach the residual level threshold TH, the power supply controller 132 waits for a predetermined time, and then executes the processing in step S46 again. Then, when the acquired residual battery level is equal to or higher than the residual level threshold TH, the power supply controller 132 executes the processing in step S49.

(Step S47) The power supply controller 132 sets status information indicating a second normal state in which neither a CM nor a BBU is failed, in the storage 120. Then, the power supply controller 132 turns ON both the switches 112*a* and 112*b* within the CM 100*a*.

(Step S48) The power supply controller 132 acquires a residual battery level of a BBU capable of supplying electric power to the CM 100*a*, from the BBU. In step S48, since two BBUs are capable of supplying electric power to the CM 100*a*, residual battery levels are acquired from these two BBUs. The power supply controller 132 determines whether each of the acquired residual battery levels is equal to or higher than the residual level threshold TH. When the residual battery level of at least one BBU does not reach the residual level threshold TH, the power supply controller 132 waits for a predetermined time, and then executes the processing in step S48 again. Then, when the residual battery level of each of the both BBUs is equal to or higher than the residual level threshold TH, the power supply controller 132 executes the processing in step S49.

(Step S49) Through any of processings in steps S43, S46, and S48, it is determined that minimum electric power required for executing a backup processing at the time of power outage is accumulated in a BBU. Thus, the power supply controller 132 notifies the access controller 131 that switching to a write back mode is allowed. Upon receiving the notification, the access controller 131 switches a write control mode on a logical volume, from a write through mode to a write back mode.

Third Embodiment

In the above-described second embodiment, each of CMs mounted in a storage device controls the switches 112a and 112b provided in its own device by using information collected from other CMs or BBUs. However, in another example, one CM among CMs mounted in a storage device may become a master CM so as to comprehensively control the switches 112a and 112b of all the CMs. Hereinafter, descriptions will be made on an example of this case in the third embodiment.

Figure 24:
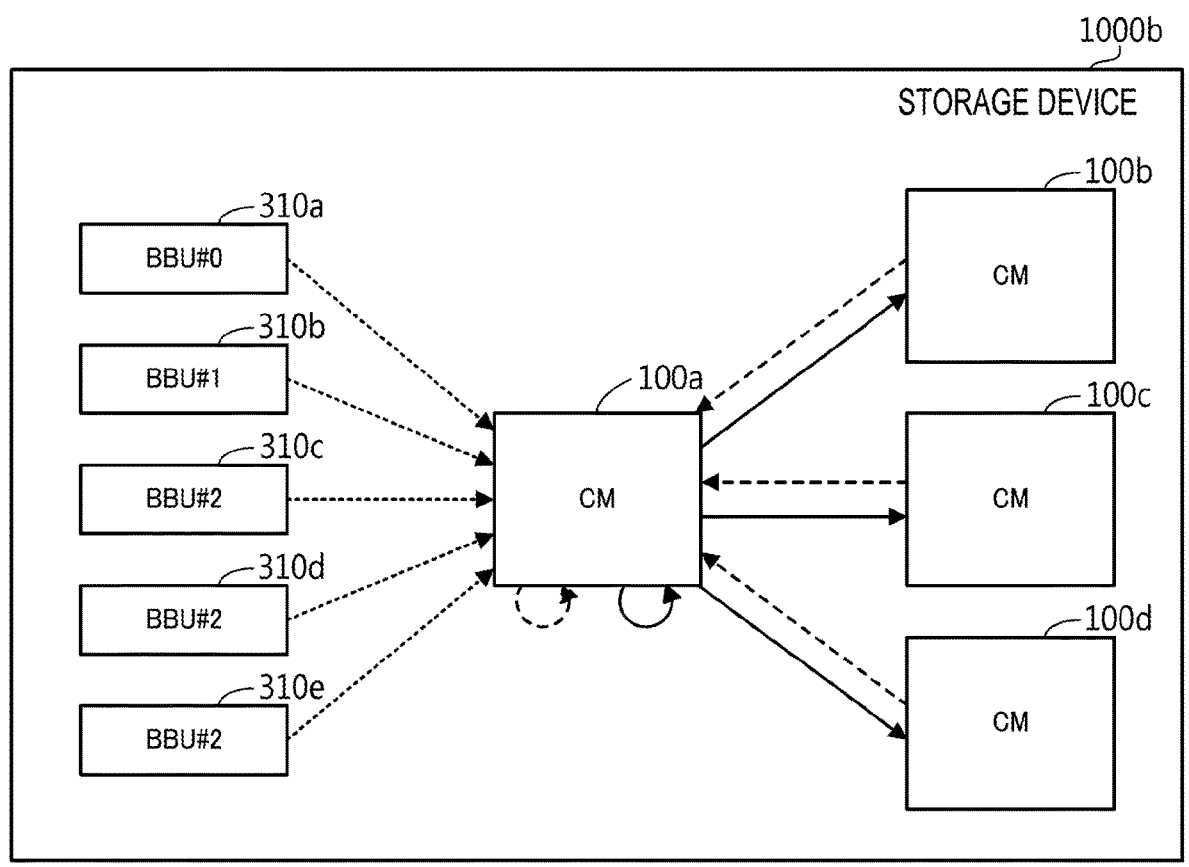
FIG. 24 is a view illustrating a storage device according to a third embodiment.

FIG. 24 is a view illustrating a storage device according to a third embodiment. As an example, a storage device 1000b illustrated in FIG. 24 includes four CMs 100a to 100d and five BBUs 310a to 310e. It is assumed that a coupling relationship between the CMs 100a to 100d and the BBUs 310a to 310e or between the CMs is the same as that in FIGS. 12 and 13.

In FIG. 24, it is assumed that, as an example, the CM 100a is set as a master CM. In this case, the CM 100a collects information indicating an operation status of each of the BBUs 310a to 310e, information indicating an operation status of each of the CMs 100a to 100d, or a dirty data amount in each of the CMs 100a to 100d.

Then, when one CM is failed, the CM 100a instructs all CMs other than the failed CM to turn ON both the switches 112a and 112b. When one BBU is failed, the CM 100a transmits a switch control signal indicating ON/OFF of the switches 112a and 112b, to each of the CMs 100a to 100d, based on the control table 123.

Further, when a power outage occurs in a state where neither a CM nor a BBU is failed, the CM 100a determines a CM having a maximum amount of dirty data. Then, based on the determination result and the control table 124, the CM 100a transmits a switch control signal indicating ON/OFF of the switches 112a and 112b to each of the CMs 100a to 100d. The CM 100a instructs each of the CMs 100a to 100d to start a backup processing when a power outage occurs. Accordingly, in each of the CMs 100a to 100d, a backup processing for a backup memory is executed.

Meanwhile, after power is restored, the CM 100a collects information indicating an operation status of each of the BBUs 310a to 310e or information indicating an operation status of each of the CMs 100a to 100d. The CM 100a collects the residual battery level of each of the BBUs 310a to 310e at fixed time intervals.

When one CM is failed, or when neither a CM nor a BBU is failed, the CM 100a instructs all CMs other than the failed CM to turn ON both the switches 112a and 112b. When one BBU is failed, the CM 100a instructs each of the CMs 100a to 100d to turn ON/OFF the switches 112a and 112b based on the control table 123. Then, the CM 100a instructs each of the CMs in operation to switch a write control mode to a write back mode at a timing based on the comparison between a residual battery level of each of the BBUs in operation and a threshold. The threshold used for comparison is determined in the order of steps S43, S46, and S48 of FIG. 23, in each CM.

Through the above processings, as in the second embodiment, in the storage device 1000b as well, even when a BBU is failed, all CMs may execute backup processings while the number of BBUs is suppressed to only one more than the number of CMs. In a CM having a smaller amount of dirty data included in a cache area of the CM, a period until a write control mode is switched to a write back mode after power is restored may be shortened. Further, for a CM having a maximum amount of dirty data, it is possible to shorten a period until a write control mode is switched to a write back mode from power restoration.

Processing functions of devices (the electronic components 1a to 1c, and the CMs 100a to 100d) illustrated in each of the above-described embodiments may be implemented by a computer. In such a case, a program that describes processing contents of a function to be possessed by each device is provided. The program is executed by the computer such that the above processing functions are implemented on the computer. The program that describes the processing contents may be recorded in a computer-readable recording medium. As for the computer-readable recording medium, a magnetic storage device, an optical disk, a magneto-optical recording medium, a semiconductor memory, etc. may be exemplified. As the magnetic storage device, a hard disk device (HDD), a flexible disk (FD), a magnetic tape, etc. may be exemplified. As the optical disk, a compact disc (CD), a digital versatile disc (DVD), a Blu-ray disk (BD), etc. may be exemplified. As the magneto-optical recording medium, a magneto-optical disk (MO), etc. may be exemplified.

When a program is distributed, for example, a portable recording medium in which the program is recorded, such as a DVD or a CD-ROM, is sold. The program may also be stored in a storage device of a server computer, and then may be transmitted to another computer from the server computer via a network.

A computer that executes a program stores, for example, a program recorded in a portable recording medium or a program transmitted from a server computer, in its own storage device. Then, the computer reads the program from its own storage device, and executes a processing in accordance with the program. The computer may also directly read a program from the portable recording medium, so as to execute a processing in accordance with the program. Each time a program is transmitted from the server computer coupled to the computer via a network, the computer may also sequentially execute processing in accordance with the received programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. An electronic system comprising:
N electronic components, where N is an integer of 2 or more;
(N+1) batteries; and
N selection circuits associated with the respective N electronic components,
wherein
each of the N electronic components is coupled to two batteries among the (N+1) batteries,
combinations of two batteries coupled to the respective N electronic components are different from each other,
each of (N−1) batteries among the (N+1) batteries is coupled to two electronic components among the N electronic components, combinations of two electronic components coupled to the respective (N−1) batteries are different from each other, and each of the N selection circuits is configured to supply, as driving power, electric power output from at least one of two batteries coupled to a corresponding electronic component among the N electronic components to the corresponding electronic component.

2. The electronic system according to claim 1, further comprising at least one processor configured to:

control, when one battery among the (N+1) batteries is failed, an operation of the N selection circuits such that electric power is supplied to the N electronic components from respective N batteries among the (N+1) batteries excluding the failed one battery.

3. The electronic system according to claim 1, further comprising at least one processor configured to:

control an operation of the N selection circuits when a power outage occurs in which supply of electric power from an external power source is stopped in a normal state where the (N+1) batteries are normally operating, such that electric power is supplied to one electronic component among the N electronic components from two batteries among the (N+1) batteries and electric power is supplied to remaining (N−1) electronic components excluding the one electronic component from respective (N−1) batteries among the (N+1) batteries excluding the two batteries.

4. The electronic system according to claim 3, wherein each of the N electronic components includes one of the at least one processor, a volatile memory, and a non-volatile memory, and performs an access control of controlling an access to a storage device by using a cache area included in the volatile memory, and the at least one processor is further configured to:

stop, when the power outage occurs, the access control on the storage device and write dirty data included in the cache area to the non-volatile memory by using electric power supplied via a corresponding selection circuit; and select, when the power outage occurs in the normal state, an electronic component having a maximum amount of dirty data included in the cache area as the one electronic component from among the N electronic components.

5. The electronic system according to claim 4, wherein charging for the (N+1) batteries is started with electric power from the external power source when the supply of electric power from the external power source is restored, and the at least one processor is further configured to:

resume, when the supply of electric power from the external power source is restored, the access control on the storage device using the cache area in a write through mode in which a response of writing completion is given after data is written in the cache area and the storage device; and switch, when a residual battery level of a coupled battery reaches a predetermined amount, a mode of writing data from the write through mode to a write back mode in which a response of writing completion is given after data is written in the cache area and before written in the storage device.

6. An information processing device included in N information processing devices where N is an integer of 2 or more, the information processing device comprising:

a memory; and a processor coupled to the memory and the processor configured to control electric power to be supplied to the information processing device;

wherein each of the N information processing devices is coupled to two batteries among (N+1) batteries, combinations of two batteries coupled to the respective N information processing devices are different from each other, each of (N−1) batteries among the (N+1) batteries is coupled to two information processing devices among the N information processing devices, combinations of two information processing devices coupled to the respective (N−1) batteries are different from each other, N selection circuits are associated with the respective N information processing devices, and each of the N selection circuits is configured to supply, as driving power, electric power output from at least one of two batteries coupled to a corresponding information processing device among the N information processing devices to the corresponding information processing device, and the processor is further configured to:

control whether each of the two batteries coupled to one selection circuit associated with the information processing device is to supply electric power to the information processing device.

7. The information processing device according to claim 6, wherein the processor is further configured to:

control, when one battery among the (N+1) batteries is failed, an operation of the one selection circuit in a way consistent with a condition that electric power is supplied to the N information processing devices from respective N batteries among the (N+1) batteries excluding the failed one battery.

8. The information processing device according to claim 6, wherein the processor is further configured to:

control an operation of the one selection circuit when a power outage occurs in which supply of electric power from an external power source is stopped in a normal state where the (N+1) batteries are normally operating, in a way consistent with a condition that electric power is supplied to one information processing device among the N information processing devices from two batteries among the (N+1) batteries and electric power is supplied to remaining (N−1) information processing devices excluding the one information processing device from respective (N−1) batteries among the (N+1) batteries excluding the two batteries.

9. The information processing device according to claim 8, wherein the N information processing devices include respective processors, respective volatile memories, and respective non-volatile memories and are configured to perform an access control of controlling an access to a storage device by using a cache area included in the respective volatile memories, and the processor is further configured to:

stop, when the power outage occurs, the access control on the storage device and write dirty data included in the cache area to the non-volatile memory by using electric power supplied via the one selection circuit; and control, when the power outage occurs in the normal state, an operation of the one selection circuit select in a way consistent with a condition that an information processing device having a maximum amount of dirty data included in the cache area is selected as the one information processing device from among the N information processing devices.

10. The information processing device according to claim 9, wherein
charging for the (N+1) batteries is started with electric power from the external power source when the supply of electric power from the external power source is restored, and
the processor is further configured to:
resume, when the supply of electric power from the external power source is restored, the access control on the storage device using the cache area in a write through mode in which a response of writing completion is given after data is written in the cache area and the storage device; and
switch, when a residual battery level of a coupled battery reaches a predetermined amount, a mode of writing data from the write through mode to a write back mode in which a response of writing completion is given after data is written in the cache area and before written in the storage device.

11. A control method of controlling electric power to be supplied to a computer included in N computers where N is an integer of 2 or more, each of the N computers being coupled to two batteries among (N+1) batteries, combinations of two batteries coupled to the respective N computers being different from each other, each of (N−1) batteries among the (N+1) batteries being coupled to two computers among the N computers, combinations of two computers coupled to the respective (N−1) batteries being different from each other, N selection circuits are associated with the respective N computers, and each of the N selection circuits being configured to supply, as driving power, electric power output from at least one of two batteries coupled to a corresponding computer among the N computers to the corresponding computer, the method comprises:
determining a status of a failure in the (N+1) batteries; and
controlling, by the computer, whether each of the two batteries coupled to one selection circuit associated with the computer is to supply electric power to the computer depending on the status.

* * * * *